US012799921B2

(12) United States Patent
Kato

(10) Patent No.: US 12,799,921 B2
(45) Date of Patent: Nov. 17, 2026

(54) VEHICLE AND ROTOR BLADE

(71) Applicant: Eco Technology Co., Ltd., Nagoya (JP)

(72) Inventor: Masaharu Kato, Nagoya (JP)

(73) Assignee: Eco Technology Co., Ltd. (JP)

( * ) Notice: Subject to any disclaimer, the term of this patent is extended or adjusted under 35 U.S.C. 154(b) by 271 days.

(21) Appl. No.: 18/287,274

(22) PCT Filed: Oct. 21, 2021

(86) PCT No.: PCT/JP2021/038926
§ 371 (c)(1),
(2) Date: Oct. 17, 2023

(87) PCT Pub. No.: WO2022/269938
PCT Pub. Date: Dec. 29, 2022

(65) Prior Publication Data

US 2025/0243846 A1 Jul. 31, 2025

(30) Foreign Application Priority Data

Jun. 22, 2021 (JP) ................................ 2021-102908

(51) Int. Cl.
*F03D 9/32* (2016.01)
*B60L 8/00* (2006.01)

(52) U.S. Cl.
CPC ................ *F03D 9/32* (2016.05); *B60L 8/006* (2013.01); *B60L 2200/36* (2013.01); (Continued)

(58) Field of Classification Search
CPC ................ F03D 9/32; F05B 2220/7068; F05B 2240/2212; F05B 2240/301; B60L 8/006; B60L 2200/36
See application file for complete search history.

(56) References Cited

U.S. PATENT DOCUMENTS 3,713,503 A 1/1973 Haan
8,198,747 B2 * 6/2012 Kato ....................... F03D 3/061
416/223 R
(Continued)

FOREIGN PATENT DOCUMENTS

CN 109606126 4/2019
DE 3611750 10/1987
(Continued)

OTHER PUBLICATIONS

Nov. 30, 2021—International Search Report, PCT/JP2021/038926, 4 pages.
(Continued)

*Primary Examiner* — John D Walters
(74) *Attorney, Agent, or Firm* — Polsinelli PC

(57) ABSTRACT

Provided is a vehicle with a front-side cover that forms an outer surface more forward than a windshield. The vehicle forms a front opening facing an outer space in front; and an upper opening positioned behind and above the front opening. The inside of the front-side cover includes an inner cover forming a passage for guiding wind entering from the front opening. A rotor blade for wind power generation is disposed within the inner cover. A front end of the upper opening is further upward than a rear end thereof. The area of an outlet of the passage is greater than the area of an inlet thereof. The inner cover has an arcuate portion that hides a region above the rotational axis of the rotor blade when seen from the front opening. The center angle of the arcuate portion is set to a range of 90-180 degrees.

11 Claims, 18 Drawing Sheets

(52) U.S. Cl.
CPC ................. *F05B 2220/7068* (2013.01); *F05B 2240/2212* (2013.01); *F05B 2240/301* (2013.01)

(56) References Cited

U.S. PATENT DOCUMENTS

| | | | | |
|---|---|---|---|---|
| 9,103,317 | B2 * | 8/2015 | Garcia | F03D 9/11 |
| 9,370,995 | B2 * | 6/2016 | Jeong | B62D 25/085 |
| 10,814,728 | B2 * | 10/2020 | Chang | B60L 8/006 |
| 2009/0167027 | A1 | 7/2009 | Kato | |
| 2011/0037261 | A1 | 2/2011 | Champ et al. | |
| 2017/0326946 | A1 * | 11/2017 | Jacob | B60H 1/00778 |
| 2017/0342964 | A1 * | 11/2017 | Cianflone | F03D 9/32 |

FOREIGN PATENT DOCUMENTS

| | | | | |
|---|---|---|---|---|
| DE | 102021005349 | A1 * | 4/2023 | F03D 9/32 |
| JP | 2003299207 | A | 10/2003 | |
| JP | 3986548 | B | 10/2007 | |
| JP | 2008190518 | A | 8/2008 | |
| JP | 2010144614 | | 7/2010 | |
| JP | 2021102908 | A | 7/2021 | |

OTHER PUBLICATIONS

Sep. 13, 2023—Written Opinion, PCT/JP2021/038926, 8 pages.

European Application No. 21947217.2, Extended European Search Report dated May 6, 2025, 9 pages.

European Patent Application No. 21947217.2, European Office Action dated Dec. 12, 2025 in 7 pages.

* cited by examiner

VEHICLE AND ROTOR BLADE

CROSS-REFERENCE TO RELATED APPLICATIONS

The present application is a U.S. National Stage application of the Patent Cooperation Treaty (PCT) application PCT/JP2021/038926, filed Oct. 21, 2021, which claims priority to Japanese Patent Application No. 2021-102908, filed Jun. 22, 2021, each of which is incorporated herein in its entirety.

TECHNICAL FIELD

The present disclosure relates to a vehicle on which a rotor blade for wind power generation is mounted, and the rotor blade.

BACKGROUND ART

Patent Document 1 below discloses a vehicle equipped with a wind power generation device. A rotor blade of the wind power generation device of Patent Document 1 includes a front blade surface that is parallel to a rotation axis and that is curved so as to project forward in the rotation direction, and a rear blade surface that is disposed on a back surface side of the front blade surface, that is parallel to the rotation axis, that is curved so as to be recessed forward in the rotation direction, and that has a curvature depth smaller than that of the front blade surface. The front blade surface includes a first curved surface (high-speed wind flow passage surface, first surface) constituting a section away from the rotation axis and a second curved surface (low-speed wind flow passage surface, second surface) constituting a section close to the rotation axis and having a surface length shorter than that of the first curved surface in a plan view. It is possible to rotate this rotor blade by drag generated when the rotor blade receives wind on the rear blade surface and lift generated by a speed difference between wind flows flowing along the first curved surface and the second curved surface of the front blade surface.

In addition, Patent Document 1 describes that the wind power generation device is provided in an engine room or on a ceiling of a vehicle.

CITATION LIST

Patent Document

Patent Document 1: Japanese Patent No. 3986548

SUMMARY OF INVENTION

Technical Problem

Needless to say, it is desirable to more efficiently rotate the rotor blade mounted on a vehicle.

In this respect, an object of the disclosure is to efficiently rotate a rotor blade mounted on a vehicle.

Solution to Problem

In order to achieve the above-described object, the vehicle of the disclosure includes: an outer cover that is exposed to an outer space of the vehicle and that forms a front opening facing an outer space in front and an upper opening positioned behind and above the front opening and facing an outer space above; a passage forming unit that forms a passage for guiding wind that enters from the front opening to the upper opening inside the outer cover; and a rotor blade for wind power generation that is provided in the passage to be rotatable about a rotation axis directed in a right-left direction of the vehicle. The rotor blade includes a front blade surface that is parallel to the rotation axis and that is curved so as to be project forward in a rotation direction; and a rear blade surface that is disposed on a back surface side of the front blade surface, that is parallel to the rotation axis and that is curved to so as be recessed toward the front side in the rotation direction, the rear blade surface having a smaller curvature depth than the front blade surface. In a plan view orthogonal to the rotation axis, an end portion of the front blade surface on a side far from the rotation axis is defined as an outer end portion, and an end portion of the front blade surface on a side close to the rotation axis is defined as an inner end portion. The front blade surface includes a first curved surface that constitutes a section away from the rotation axis and that extends from the outer end portion toward the front side in the rotation direction; and a second curved surface that constitutes a section close to the rotation axis, that is connected to the inner end portion from an opposite side, of the first curved surface, from the outer end portion toward a rear side in the rotation direction, and that has a shorter surface length than the first curved surface in the plan view.

According to this configuration, it is possible to generate drag for rotating the rotor blade by receiving the wind on the rear blade surface. In addition, lift can be generated by a difference in flow velocity between wind flowing rearward along the first curved surface of the front blade surface and wind flowing rearward along the second curved surface. The rotor blades can be efficiently rotated by the drag and the lift.

In addition, since the front opening of the outer cover faces the outer space in front of the vehicle, wind from the front side can be efficiently taken into the outer cover. In addition, the upper opening of the outer cover faces the outer space above the vehicle at a position behind and above the front opening. Here, in a case where the running wind from the front side during traveling of the vehicle flows toward the upper opening along the outer cover, negative pressure (in other words, minus pressure) lower than surrounding air pressure is likely to be generated at the position of the upper opening. This negative pressure causes the wind guided to the rotor blade in the outer cover to efficiently flow toward the upper opening. Further, since the passage forming unit that forms a passage for guiding wind entering the upper opening from the front opening is provided inside the outer cover, and the rotor blade is provided in the passage, the wind entering from the front opening can be efficiently guided to the rotor blade, and the wind passing by the rotor blade can be efficiently guided to the upper opening. As a result, the rotor blade can be efficiently rotated.

According to the disclosure, a vehicle-mounted rotor blade for wind power generation is provided to be rotatable about the rotation axis, the rotor blade including: a front blade surface that is parallel to the rotation axis and that is curved so as to be project forward in a rotation direction; and a rear blade surface that is disposed on a back surface side of the front blade surface, that is parallel to the rotation axis and that is curved so as to be recessed toward the front side in the rotation direction, the rear blade surface having a smaller curvature depth than the front blade surface. In a plan view orthogonal to the rotation axis, an end portion of the front blade surface on a side far from the rotation axis is defined as an outer end portion, and an end portion of the front blade surface on a side close to the rotation axis is defined as an inner end portion. The front blade surface includes a first curved surface that constitutes a section away from the rotation axis and that extends from the outer end portion toward the front side in the rotation direction; and a second curved surface that constitutes a section close to the rotation axis, that is connected to the inner end portion from an opposite side, the first curved surface, from the outer end portion toward a rear side in the rotation direction, and that has a shorter surface length than the first curved surface in the plan view. The outer end portion has a plurality of recesses which penetrate a portion between the first curved surface and the rear blade surface and are formed in a direction in which the outer end portion extends.

According to this configuration, the rotor blade can be efficiently rotated by the drag generated on the rear blade surface and the lift generated on the front blade surface. In addition, the plurality of recesses formed at the outer end portion positioned at a boundary between the front blade surface and the rear blade surface enable the wind flow that causes the rotor blade to rotate in the opposite direction to quickly pass from the first curved surface side of the front blade surface to the rear blade surface side. As a result, it is possible to reduce the pressure which is generated at the outer end portion and causes the rotor blade to rotate in the opposite direction, and to efficiently rotate the rotor blade.

DESCRIPTION OF EMBODIMENTS

First Embodiment

Figure 1:
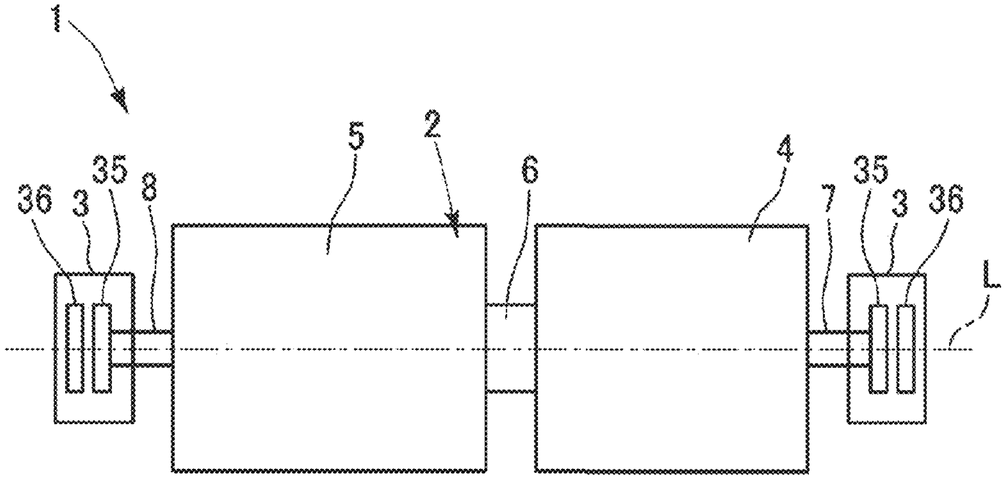
FIG. 1 is a schematic diagram of a wind power generation device.
Figure 10:
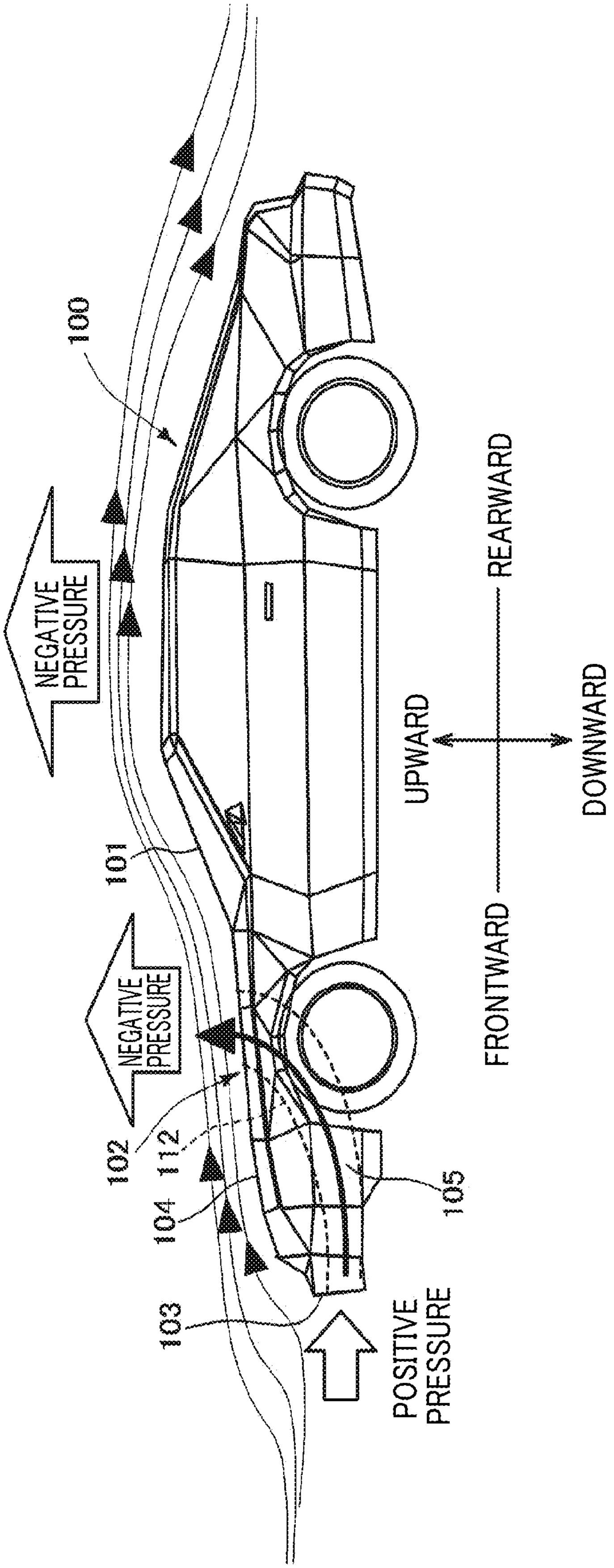
FIG. 10 is a side view of a vehicle according to a first embodiment.
Figure 11:
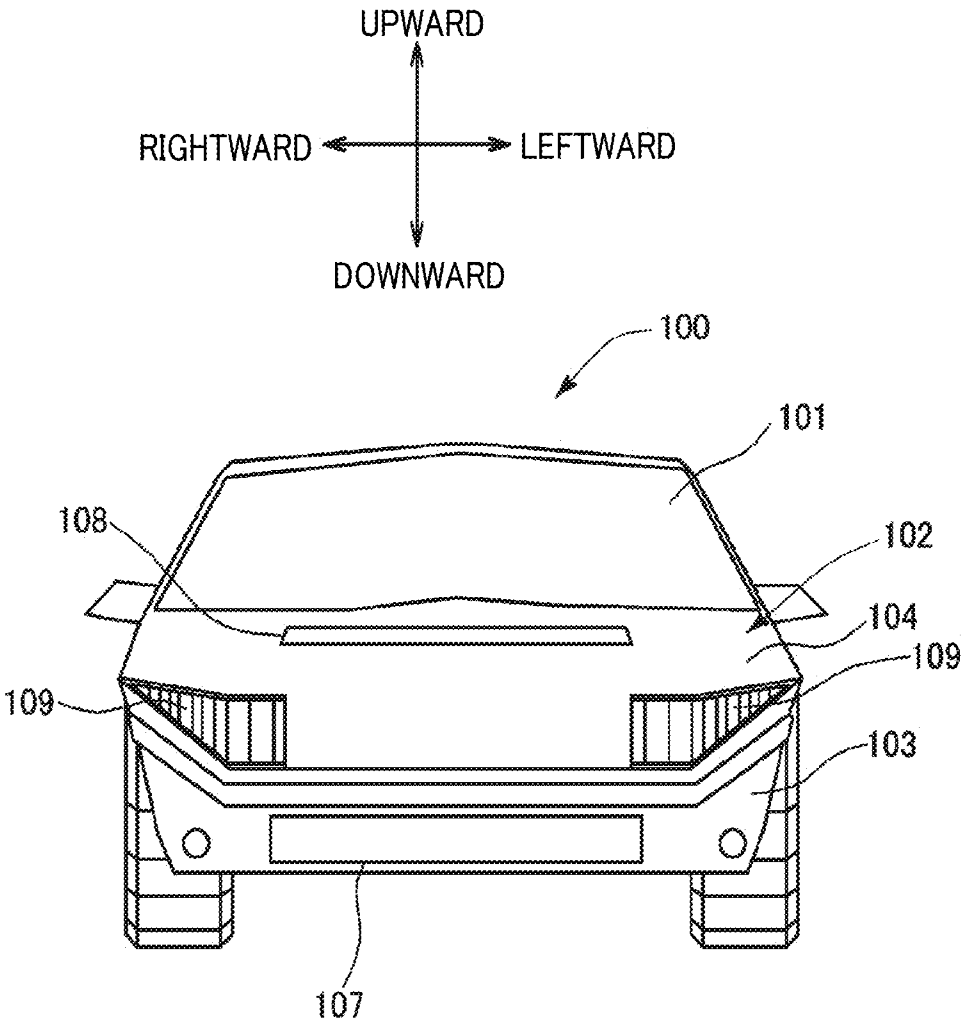
FIG. 11 is a front view of the vehicle according to the first embodiment.

Hereinafter, a first embodiment of the disclosure will be described with reference to the drawings. FIG. 1 is a schematic diagram of a wind power generation device 1 according to the embodiment. The wind volume power generation device 1 is provided in a state in which a rotation axis L is directed in a vehicle width direction (right-left direction) of a vehicle 2 in the vehicle 100 as shown in FIGS. 10 and 11. The wind power generation device 1 includes a rotation device 2 that rotates around the rotation axis L and a power generation unit 3 that generates power with the rotation of the rotation device 2.

Figure 2:
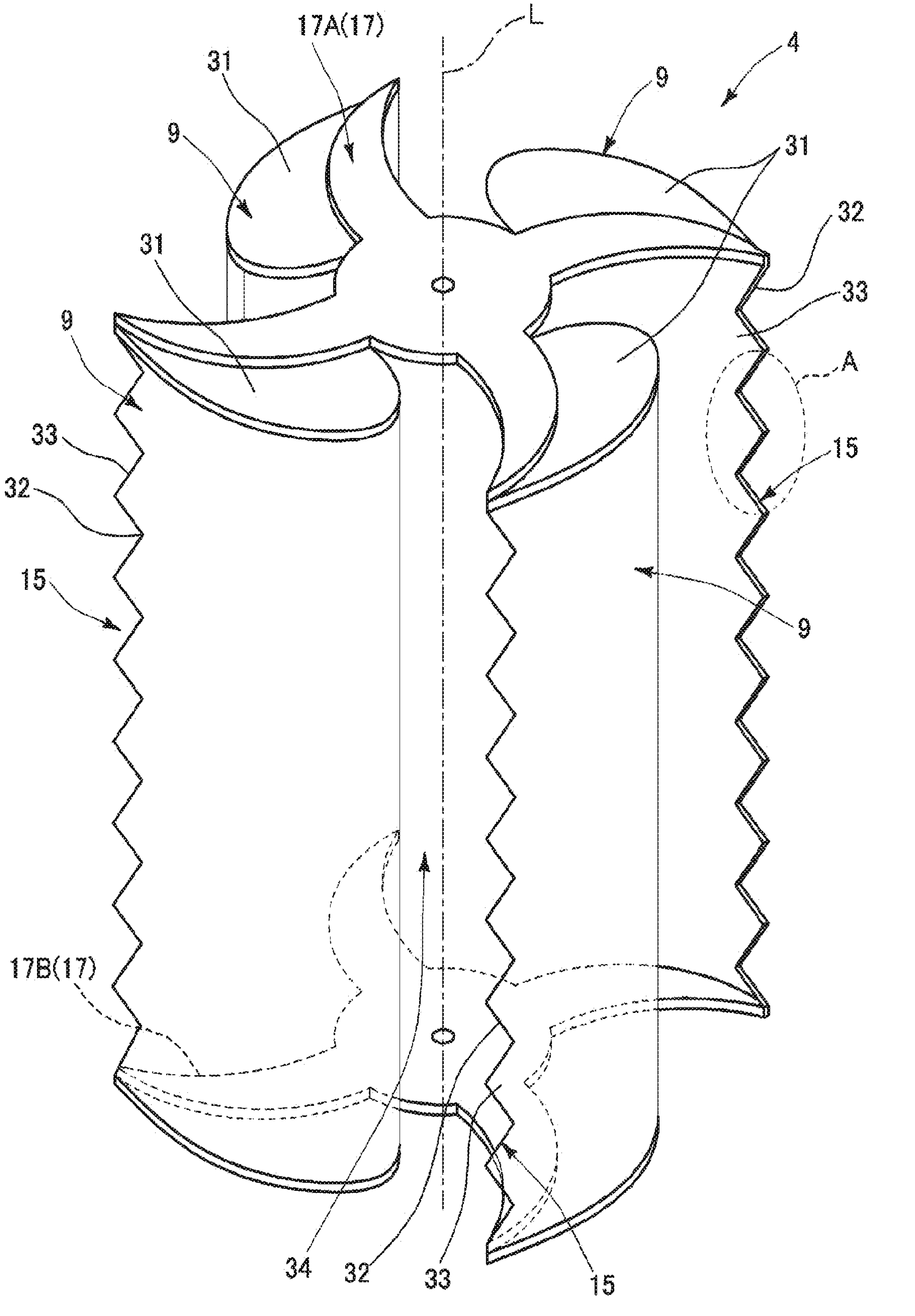
FIG. 2 is a perspective view of a first rotation unit of a rotation device.
Figure 3:
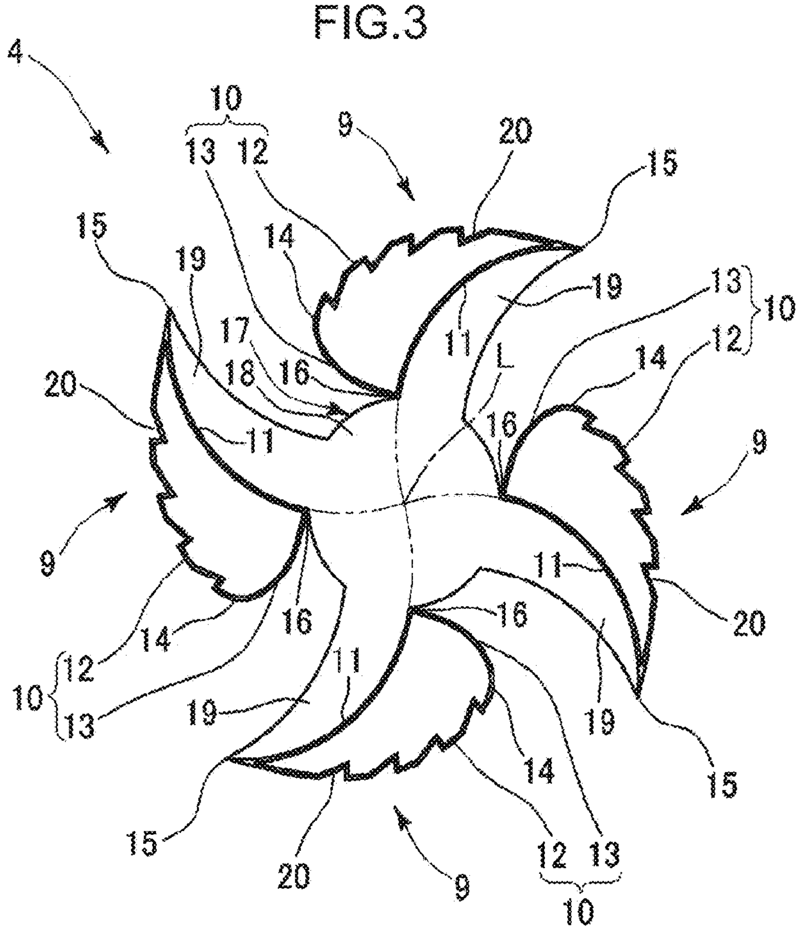
FIG. 3 is a top view of the first rotation unit.

The rotation device 2 includes a first rotation unit 4, a second rotation unit 5, a spacer 6, and rotation shafts 7 and 8. The first rotation unit 4 and the second rotation unit 5 are provided to share the rotation axis L and be on a right side and a left side, respectively, in a direction of the rotation axis L with the spacer 6 interposed therebetween. As shown in FIGS. 2 and 3, the first rotation unit 4 includes four rotor blades 9. Moreover, in FIG. 2, the rotation axis L is directed in a vertical direction, but the first rotation unit 4 is actually provided in a state in which the rotation axis L is directed in the vehicle width direction as described above. In addition, in FIG. 2, a recess 20 (see FIG. 3) to be described below is not shown. In addition, in FIG. 3, a lid plate 31 (see FIG. 2) to be described below is not shown.

The four rotor blades 9 have the same shape and differ only in attachment positions. The four rotor blades 9 are arranged at equal intervals in a circumferential direction around the rotation axis L (that is, at intervals of 90 degrees in rotation angle) and at positions at the same distances from the rotation axis L in a radial direction. As a material of the rotor blade 9, light alloys such as aluminum, duralumin, and titanium, synthetic resins such as glass fiber reinforced plastic (GFRP), carbon fiber reinforced plastic (CFRP), and polycarbonate (PC), or the like can be used.

Figure 4:
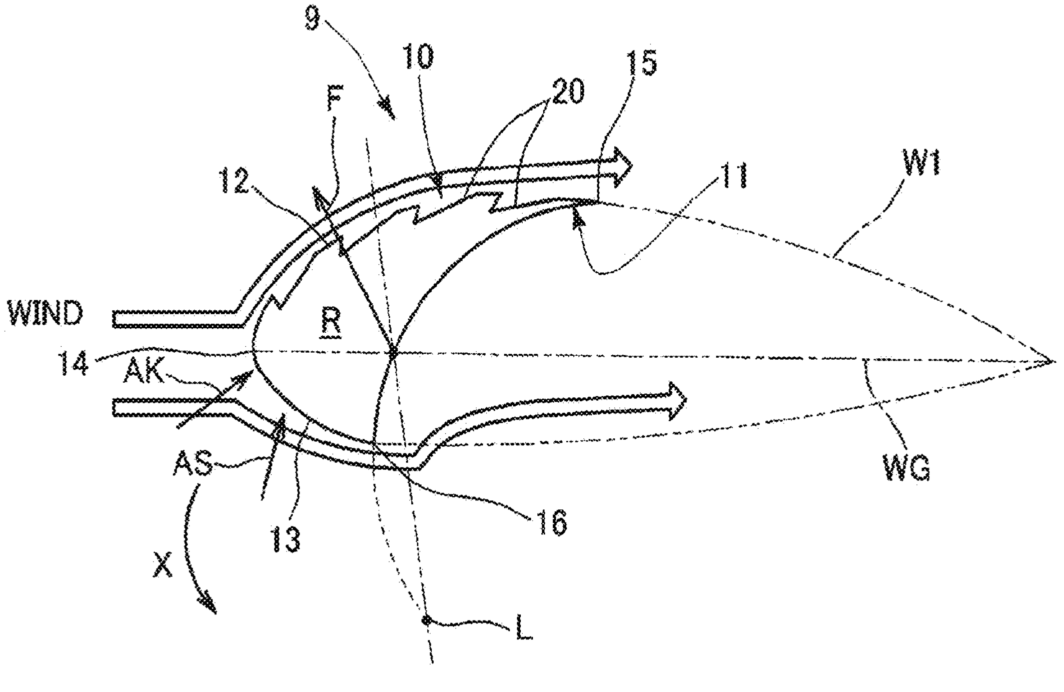
FIG. 4 is a plan view of a rotor blade.

The rotor blade 9 is a member that receives a wind flow (wind force) in a direction orthogonal to the rotation axis L and generates a rotational force by the received wind flow. As shown in FIG. 4, the rotor blade 9 is assumed to have a blade shape WI when viewed in a direction of the axis L (plan view orthogonal to the axis L) and has a shape using a front portion thereof. The blade shape WI has a shape similar to a cross-section of a wing of a general airplane capable of generating lift with respect to wind from a front side and has a shape in which one side (a side of a first curved surface 12 to be described below) bulges more than the other side (a side of a second curved surface 13 to be described below) with respect to a blade chord WG. When an orientation of relative wind along with the rotation is represented by AK, and an orientation of natural wind is represented by AS, lift F acts on the rotor blades 9 and the rotor blades rotate in an X direction around the rotation axis L.

A cross-section of the rotor blade 9 viewed from an axis L direction has the same shape at any horizontal cross-sectional position. As shown in FIG. 3, the rotor blade 9 is configured to include a front-side plate 10 on a front side in a forward direction (rotation direction) X and a rear-side plate 11 on a rear side in the forward direction X when viewed from the axis L direction. A space is formed between the plates 10 and 11, that is, the rotor blade 9 has a hollow shape.

A front blade surface, which is an outer surface of the front-side plate 10, is configured as a convex curved surface that is parallel to the rotation axis L and that is curved so as to be project forward in the rotation direction X. The front blade surface 10 is formed in a shape having a curvature depth larger than that of the rear-side plate 11 (rear blade surface). Specifically, the front blade surface 10 has an apex portion 14 where the curvature is maximum at an intermediate position in a radial direction of the rotation of the rotor blade 9. The front blade surface 10 has a first curved surface 12 positioned on a side farther from a rotation center (rotation axis L) than the apex portion 14 and facing an outer side in the radial direction of the rotation and a second curved surface 13 positioned closer to a rotation center side than the apex portion 14 and facing the rotation direction X. The apex portion 14 is a portion (boundary portion) positioned at a boundary between the first curved surface 12 and the second curved surface 13.

The first curved surface 12 is disposed on a side far from the rotation axis L and is continuously formed from the apex portion 14 rearward in the rotation direction X. In other words, the first curved surface 12 is continuously formed forward in the rotation direction X from an outer end portion 15 which is an end portion on an opposite side to the apex portion 14. The first curved surface 12 is formed in an arcuate shape having constant curvature except for the vicinity of the apex portion 14, for example. As shown in FIG. 4, in a case where the blade chord WG of the blade shape WI is considered as viewed in the axis L direction, the first curved surface 12 has a curved surface shape that bulges further away from the blade chord WG than the second curved surface 13. In addition, a surface length of the first curved surface 12 in a plan view in FIGS. 3 and 4 is longer than that of the second curved surface 13, in other words, extends further rearward in the rotation direction X than the second curved surface 13. The outer end portion 15 which is a rear end portion of the first curved surface 12 in the rotation direction (an end portion on the opposite side to the apex portion 14) is disposed at a position farthest from the rotation axis L of the rotor blade 9 and is disposed behind an inner end portion 16 which is a rear end portion of the second curved surface 13 in the rotation direction X. The first curved surface 12 functions as a high-speed wind flow passing surface such that a velocity of a relative wind flow generated along the first curved surface 12 from the apex portion 14 toward the outer end portion 15 is higher than a velocity of a relative wind flow generated along the second curved surface 13 from the apex portion 14 toward the inner end portion 16.

Further, a recess 20 is partially formed on the first curved surface 12. FIGS. 3 and 4 illustrate an example in which four recesses 20 are formed per one rotor blade 9, but the number of recesses may be 5 or more or 3 or less. The plurality of recesses 20 are formed to be distributed over the entire first curved surface 12 in a plan view in FIGS. 3 and 4. In other words, when a region of the first curved surface 12 is divided into two regions with an intermediate position of the first curved surface 12 as a boundary in the plan view of FIGS. 3 and 4, the recesses 20 are formed in both the region on the outer end portion 15 side and the region on the apex portion 14 side. Further, when the region of the first curved surface 12 is divided into three equal regions or four equal regions in the plan view of FIGS. 3 and 4, the recess 20 is formed in each of the regions divided into three equal regions or each of the regions divided into four equal regions. Moreover, the recess 20 is not formed on the second curved surface 13 and the rear blade surface 11.

Figure 5:
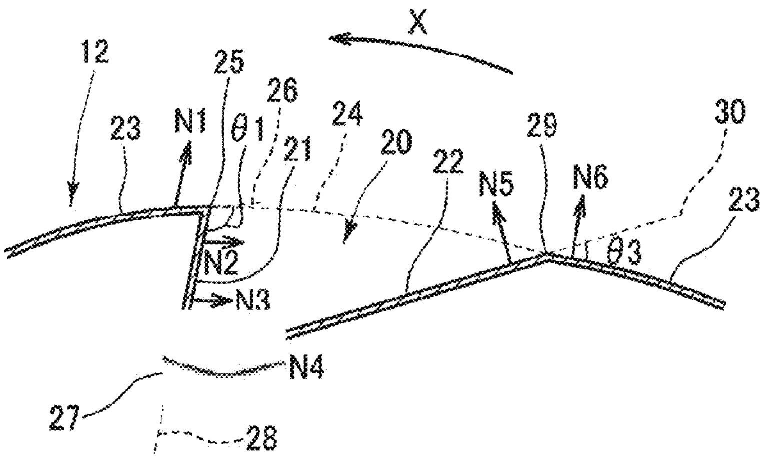
FIG. 5 is an enlarged cross-sectional view of a recess formed in a first curved surface.

In the following description, a portion of the first curved surface 12 where the recess 20 is not formed is referred to as a main surface. The recess 20 is formed in a wedge shape when viewed in a cross-section perpendicular to the rotation axis L. Specifically, as shown in FIG. 5, when viewed in the cross-section perpendicular to the rotation axis L, the recess 20 is configured to have a first inner side surface 21 forming a step facing the rear side in the rotation direction X with respect to the main surface 23 and a second inner side surface 22 formed rearward in the rotation direction X from an end portion 27 of the first inner side surface 21 in a recessed direction and connected to the main surface 23. The first inner side surface 21 constitutes an inner surface positioned on the front side in the rotation direction X of the inner surface of the recess 20. An inclination angle θ1 (see FIG. 5) of the first inner side surface 21 with respect to the main surface 23 is, for example, 60 degrees or larger and 150 degrees or smaller, and preferably 90 degrees or larger and 150 degrees or smaller. Moreover, the inclination angle θ1 is an angle formed by a first tangent line extension 26 obtained by extending a tangent line of the main surface 23 at a boundary portion 25 between the main surface 23 and the first inner side surface 21, from the boundary portion 25 toward an outer side (recess 20 side), and a tangent line of the first inner side surface 21 at the boundary portion 25. In other words, the inclination angle θ1 is an angle formed by a normal line N1 of the main surface 23 at the boundary portion 25 and a normal line N2 of the first inner side surface 21 at the boundary portion 25. Moreover, in a case where the boundary portion 25 has an R shape, the inclination angle θ1 is determined based on a tangent line or the normal line N1 of the main surface 23 and a tangent line or the normal line N2 of the first inner side surface 21 at a point where the R shape starts or ends. The first inner side surface 21 extends linearly or in a curved shape with a constant curvature from the boundary portion 25 with the main surface 23 toward the second inner side surface 22 as viewed in the cross-section of FIG. 5.

An inclination angle θ2 (see FIG. 5) of the second inner side surface 22 with respect to the first inner side surface 21 is, for example, 90 degrees or larger and 150 degrees or smaller. Moreover, the inclination angle θ2 is an angle formed by a second tangent line extension 28 obtained by extending a tangent line of the first inner side surface 21 at the boundary portion 27 between the first inner side surface 21 and the second inner side surface 22, from the boundary portion 27 toward the outer side, and a tangent line of the second inner side surface 22 at the boundary portion 27. In other words, the inclination angle θ2 is an angle formed by a normal line N3 of the first inner side surface 21 at the boundary portion 27 and a normal line N4 of the second inner side surface 22 at the boundary portion 27. Moreover, in a case where the boundary portion 27 has an R shape, the inclination angle θ2 is determined based on a tangent line or the normal line N3 of the first inner side surface 21 and a tangent line or the normal line N4 of the second inner side surface 22 at a point where the R shape starts or ends.

Here, a surface 24 (see FIG. 5) obtained by extending a surface having the same curvature as the curvature of the main surface 23 at the boundary portion 25 toward the recess 20 from the boundary portion 25 between the main surface 23 and the first inner side surface 21 is defined as a virtual curved surface. The second inner side surface 22 is formed at a position recessed from the virtual curved surface 24. The second inner side surface 22 extends linearly or in a curved shape with a constant curvature from the boundary portion 27 with the first inner side surface 21 toward the virtual curved surface 24 as viewed in the cross-section of FIG. 5.

In addition, an inclination angle θ3 (see FIG. 5) of the second inner side surface 22 with respect to the main surface 23 is an angle smaller than the inclination angles θ1 and θ2, and specifically, for example, is 10 degrees or larger and smaller than 90 degrees. Moreover, the inclination angle θ3 is an angle formed by a third tangent line extension 30 obtained by extending a tangent line of the second inner side surface 22 at a boundary portion 29 between the second inner side surface 22 and the main surface 23, from the boundary portion 29 toward the outer side, and a tangent line of the main surface 23 at the boundary portion 29. In other words, the inclination angle θ3 is an angle formed by a normal line N5 of the second inner side surface 22 at the boundary portion 29 and a normal line N6 of the main surface 23 at the boundary portion 29. Moreover, in a case where the boundary portion 29 has an R shape, the inclination angle θ3 is determined based on a tangent line or the normal line N5 of the second inner side surface 22 and a tangent line or the normal line N6 of the main surface 23 at a point where the R shape starts or ends. In addition, for example, a surface length of the second inner side surface 22 on the cross-section of FIG. 5 is longer than that of the first inner side surface 21. As a result, this makes it easy to satisfy that the inclination angle θ3 is smaller than the inclination angle θ1.

Moreover, the inclination angle θ1 has the same meaning as an inclination angle of the first inner side surface 21 with respect to the virtual curved surface 24, that is, an angle formed by a tangent line or a normal line of the virtual curved surface 24 at the boundary portion 25 between the virtual curved surface 24 and the first inner side surface 24 and a tangent line or a normal line of the first inner side surface 21 at the boundary portion 25. In addition, the inclination angle θ3 has the same meaning as an inclination angle of the second inner side surface 22 with respect to the virtual curved surface 24, that is, an angle formed by a tangent line or a normal line of the virtual curved surface 24 at the boundary portion 29 between the virtual curved surface 24 and the second inner side surface 22 and a tangent line or a normal line of the second inner side surface 22 at the boundary portion 29.

In addition, the plurality of recesses 20 may be formed with the main surface 23 interposed therebetween or may be continuously formed without the main surface 23 interposed therebetween.

In addition, each recess 20 is formed to penetrate (in other words, to be continuous) from one end portion to the other end portion of the front blade surface 10 in the direction parallel to the rotation axis L. A cross-sectional shape of the recess 20 perpendicular to the rotation axis L is formed in the same shape (shape shown in FIG. 5) at any position on the rotation axis L.

Moreover, the plurality of recesses 20 may be formed in the same shape or may be formed in different shapes. Specifically, a length of the first inner side surface 21, a length of the second inner side surface 22, or the inclination angles θ1 to θ3 may be the same or different between the plurality of recesses 20.

The second curved surface 13 is disposed on the side close to the rotation axis L and is continuously formed from the apex portion 14 toward the rear side in the rotation direction X. The second curved surface 13 is formed in an arcuate shape having a constant curvature except for the vicinity of the apex portion 14, for example. The inner end portion 16, which is the end portion of the second curved surface 13 on the opposite side to the apex portion 14, is disposed at a position closest to the rotation axis L in the rotor blade 9. In addition, the second curved surface 13 faces the rear blade surface 11 of the rotor blade 9 which is positioned adjacent in front of the second curved surface in the rotation direction X (see FIG. 3). In addition, a surface length of the second curved surface 13 in the plan view of FIGS. 3 and 4 is shorter than that of the first curved surface 12.

The rear-side plate 11 is disposed on the back surface side of the front-side plate 10 (front blade surface), connects the outer end portion 15 and the inner end portion 16 of the front-side plate 10, and is curved in a concave shape toward the front side in the rotation direction X. That is, the rear blade surface, which is the outer surface of the rear-side plate 11, is configured as a concave curved surface that is parallel to the rotation axis L and that is curved so as to be recessed forward in the rotation direction X. The rear blade surface 11 is a part of a cylindrical surface including the rotation axis L in the surface. In other words, in the plan view of FIGS. 3 and 4, the rotation axis Lis disposed at a position obtained by extending an arc, which is the shape of the rear blade surface 11, to the rotation axis L. As a result, the rotor blade 9 can cause wind (wind flow) that has hit the rear blade surface 11 to flow toward a wind tunnel portion 34 (see FIG. 2) to be described below, and the wind can hit the rotor blade 9 on an opposite side across the wind tunnel portion 34. In addition, the rear blade surface 11 has a curvature depth smaller than that of the front blade surface 10. Hence, a hollow space R (see FIG. 4) is formed between the front blade surface 10 and the rear blade surface 11.

Moreover, the outer end portion 15 of the front blade surface 10 is also an end portion (outer end portion) of the rear blade surface 11 on the side far from the rotation axis L. In addition, the inner end portion 16 of the front blade surface 10 is also an end portion (inner end portion) of the rear blade surface 11 on the side close to the rotation axis L. The outer end portion 15 and the inner end portion 16 extend in a direction parallel to the rotation axis L.

Figure 6:
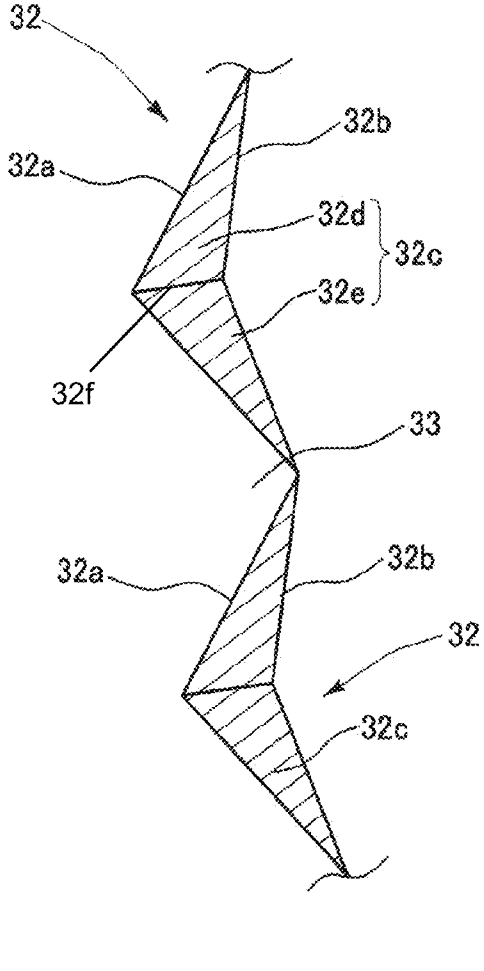
FIG. 6 is an enlarged view of portion A in FIG. 2 and is an enlarged perspective view of a recess formed at an outer end portion of the rotor blade.

As shown in FIG. 2, a plurality of recesses 32 penetrating a portion between the first curved surface 12 and the rear blade surface 11 are formed at the outer end portion 15 along a direction in which the outer end portion 15 extends (the direction parallel to the axis L). Each recess 32 is formed in a V shape. Specifically, as shown in FIG. 6, an edge line 32*a* of the recess 32 on the rear blade surface 11 side and an edge line 32*b* of the recess 32 on the first curved surface 12 side are formed in the same V shape. An inner surface 32*c* of the recess 32 is formed between the edge lines 32*a* and 32*b*. The inner surface 32*c* blocks an inner space of the rotor blade 9 so as not to be exposed from the recess 32. The inner surface 32*c* includes a first inner surface 32*d* that is gradually displaced inward (toward the axis L) as advancing in a direction parallel to the axis L and a second inner surface 32*e* that is gradually displaced outward (away from the axis L) as advancing in a direction of the axis L from a bottom portion 32*f* of the first inner surface 32. These inner surfaces 32*d* and 32*e* are configured as inclined flat surfaces inclined with respect to the axis L. An inclination angle of the first inner surface 32*d* with respect to the axis L is the same as an inclination angle of the second inner surface 32*e* with respect to the axis L.

The plurality of recesses 32 are formed to be distributed over the entire range of the outer end portion 15 from one end to the other end in the direction of the axis L. In addition, the plurality of recesses 32 are continuously formed. That is, each recess 32 is connected to the adjacent recess 32 without interposing a zone extending parallel to the axis L. Moreover, a triangular (chevron) projecting portion 33 is formed by the second inner side surface 32*e* of one recess 32 and the first inner side surface 32*d* of the other recess 32 in the two adjacent recesses 32. A plurality of projecting portions 33 are continuously formed in the direction in which the outer end portion 15 extends.

Moreover, the shape of the recess 32 may be a shape other than the V shape. In addition, the plurality of recesses 32 may be formed at intervals. That is, a zone parallel to the axis L may be interposed between the recesses 32.

As shown in FIG. 2, the rotor blade 9 includes the lid plate 31 in addition to the front-side plate 10 and the rear-side plate 11. Two lid plates 31 are provided for each rotor blade 9. The two lid plates 31 are formed in the same shape as each other and are formed in a plate shape having the same shape as the shape of the hollow space R in the plan view shown in FIG. 4. One of the two lid plates 31 is fixed to end portions on one side of the front-side plate 10 and the rear-side plate 11 in a direction parallel to the rotation axis L and blocks the space R (see FIG. 4). The other lid plate 31 is fixed to end portions on the other side of the front-side plate 10 and the rear-side plate 11 in the direction parallel to the rotation axis L and blocks the space R (see FIG. 4).

In addition, as shown in FIGS. 2 and 3, the rotor blade 9 includes a pair of blade supports 17 facing each other in the direction of the axis L. The front-side plate 10, the rear-side plate 11, and the lid plate 31 are supported by the blade supports 17. In other words, the end portions of the front blade surface 10 and the rear blade surface 11 in the direction parallel to the rotation axis L are indirectly connected (supported) by the blade support 17 via the lid plate 31. The blade support 17 supports the four rotor blades 9. As a material of the blade support 17, light alloys such as aluminum, duralumin, and titanium, synthetic resins such as glass fiber reinforced plastic (GFRP), carbon fiber reinforced plastic (CFRP), and polycarbonate (PC), or the like can be used.

The blade support 17 is formed in a plate shape and is provided such that a normal line of a central portion 18 to be described below is directed in the direction parallel to the rotation axis L. As shown in FIG. 3, the blade support 17 includes the circular central portion 18 provided at a position of the rotation axis L and four arm portions 19 radially extending outward in a radial direction from an outer circumferential edge of the central portion 18. The center of the central portion 18 is positioned on the rotation axis L.

The four arm portions 19 have the same shape as each other and are provided at equal intervals in the circumferential direction around the center (in other words, the rotation axis L) of the central portion 18. The arm portion 19 is formed in a curved shape (arcuate shape) to face the direction opposite to the rotation direction X as being away from the central portion 31. An end portion (front end portion) of the arm portion 19 on the front side in the rotation direction X and a rear end portion of the lid plate 31 overlap each other and are fixed by screws or the like, so that each rotor blade 9 (the front blade surface 10, the rear blade surface 11, and the lid plate 31) is connected to each arm portion 19.

A first blade support 17A (see FIG. 2), which is one of the pair of blade supports 17, supports one end portion of the rotor blade 9 in the direction of the rotation axis L. A second blade support 17B (see FIG. 2), which is the other of the pair of blade supports 17, supports the other end portion of the rotor blade 9 in the direction of the rotation axis L. The first rotation shaft 7 (see FIG. 1) is fixed to the center of the central portion 18 of the first blade support 17A. The spacer 6 (see FIG. 1) is fixed to the center of the central portion 18 of the second blade support 17B with a screw or the like.

As shown in FIG. 2, the wind tunnel portion 34 is formed around the rotation axis L in a portion surrounded by the pair of wind blade supports 17A and 17B and the four rotor blades 9. The wind tunnel portion 34 is a hollow portion in which a portion between the adjacent rotor blades 9 and 9 serves as an inlet and outlet of a wind flow. The wind tunnel portion 34 does not have an actual rotation axis.

Figure 7:
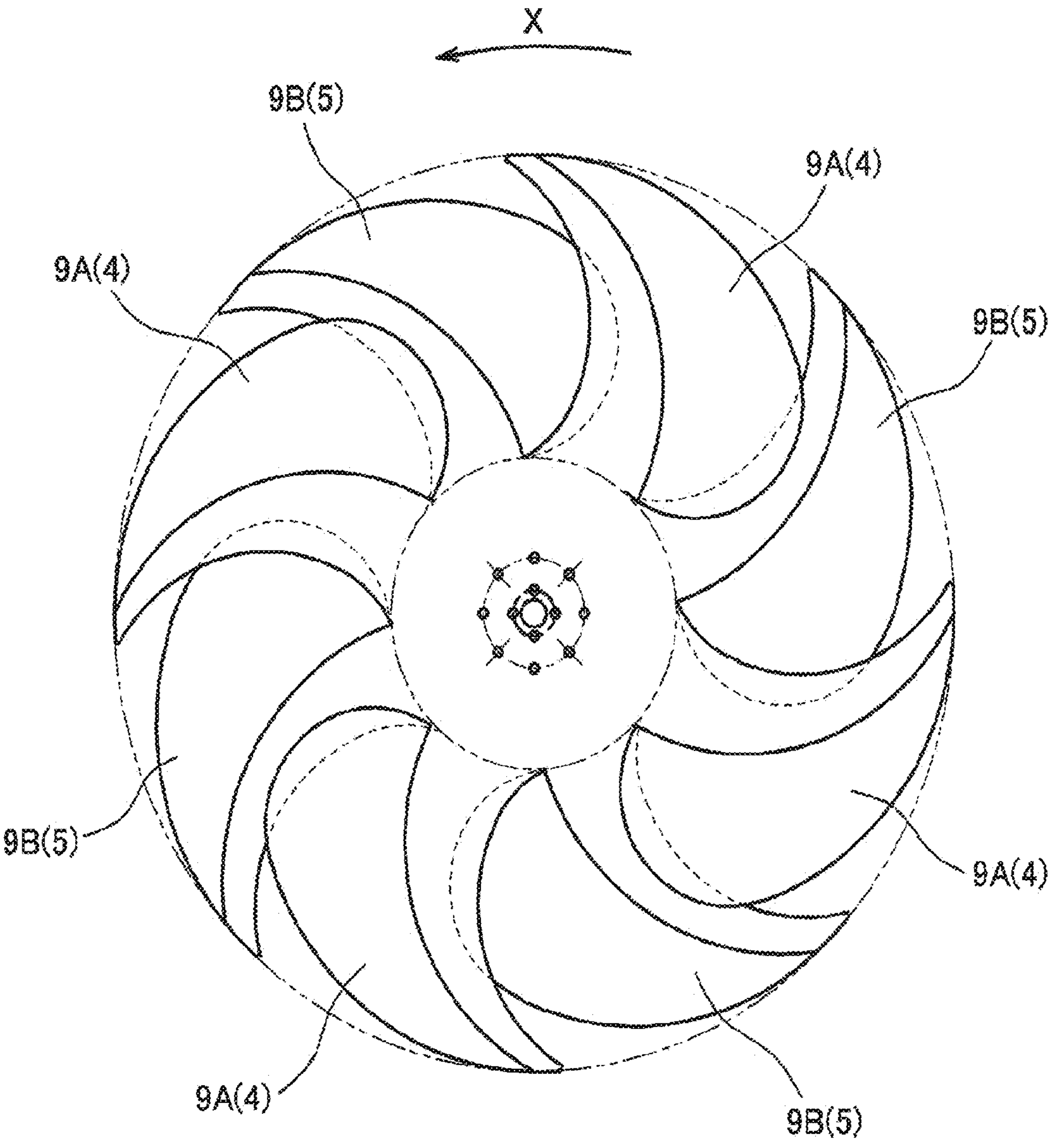
FIG. 7 is a plan view showing a positional relationship between a rotor blade of the first rotation unit and a rotor blade of a second rotation unit in a rotation direction.

The second rotation unit 5 shown in FIG. 1 is disposed at a position shifted from the first rotation unit 4 by a predetermined angle in the direction around the rotation axis L shared by the first rotation unit 4, and other configurations are the same as those of the first rotation unit 4. Specifically, the second rotation unit 5 includes a rotor blade 9 having the same shape as the rotor blade 9 of the first rotation unit 4. Hereinafter, a description will be given assuming that the reference sign of the rotor blade of the first rotation unit 4 is "9A" and the reference sign of the rotor blade of the second rotation unit 5 is "9B". As shown in FIG. 7, the second rotation unit 5 includes the same number of (that is, four) rotor blades 9B as the number of rotor blades 9A of the first rotation unit 4. The rotor blades 9B have the same shape. These rotor blades 9B are arranged at equal intervals in the direction of the rotation axis L. In addition, the rotor blades 9B are provided to rotate in the same direction X as the rotor blades 9A of the first rotation unit 4 are, that is, the rotor blades 9B are provided so that a front blade surface (convex curved surface) of the rotor blade 9B faces the direction X and a rear blade surface (concave curved surface) of the rotor blade 9B faces a direction opposite to the direction X. The predetermined angle is half an angle (specifically, 90 degrees) indicating an arrangement interval of the rotor blades 9A of the first rotation unit 4 in the direction around the rotation axis L, that is, 45 degrees. Hence, each of the rotor blades 9B of the second rotation unit 5 is provided at an intermediate position between the adjacent rotor blades 9A and 9A of the first rotation unit 4 in a plan view of FIG. 7.

The center of one blade support of the second rotation unit 5 is fixed to the spacer 6 (see FIG. 1) with a screw or the like.

In addition, the second rotation shaft 8 (see FIG. 1) is fixed to the center of the other blade support of the second rotation unit 5.

The first rotation unit 4 and the second rotation unit 5 are provided at an interval in the direction of the rotation axis L by the spacer 6 and are connected to each other to rotate integrally in the same rotation direction at the same rotation speed. Therefore, the rotor blades 9A of the first rotation unit 4 and the rotor blades 9B of the second rotation unit 5 rotate in the rotation direction X while maintaining a rotation angle difference of 45 degrees.

The spacer 6 is provided to have an axis which coincides with the rotation axis L and is provided to be rotatable about the axis.

The first rotation shaft 7 and the second rotation shaft 8 connected to both ends of the rotation device 2 in the axis L direction are members defining the rotation axis L and are supported by respective shaft supports (not shown) to be rotatable around the axis L. As a result, the rotation device 2 (the first rotation unit 4 and the second rotation unit 5) can rotate about the axis L.

Figure 8:
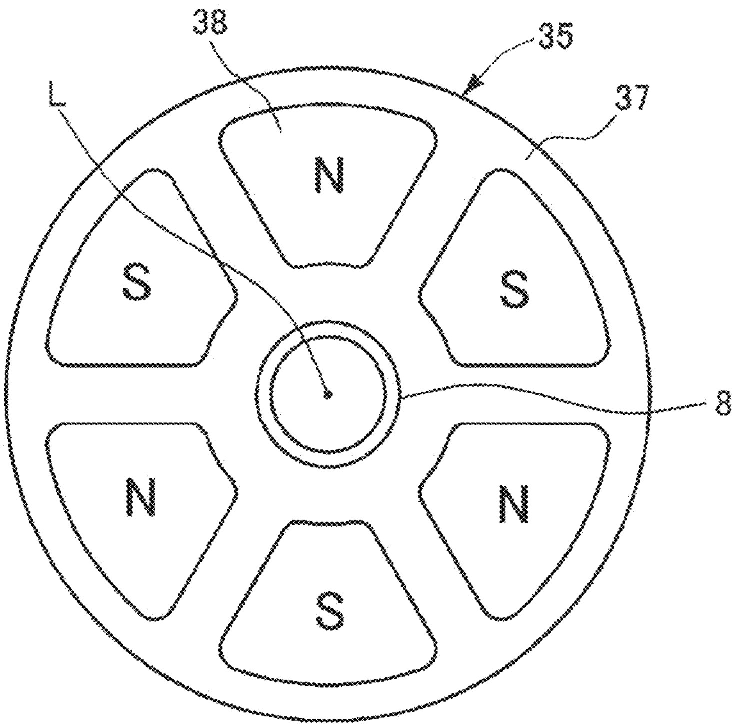
FIG. 8 is a plan view showing an arrangement of field magnets in a rotor of a power generation unit.

The power generation units 3 shown in FIG. 1 are attached to both the first rotation shaft 7 and the second rotation shaft 8. However, the disclosure is not limited thereto, and the power generation unit 3 may be attached to only one of the first rotation shaft 7 and the second rotation shaft 8. The power generation unit 3 is configured as, for example, an axial gap type power generation unit. Specifically, the power generation unit 3 includes a rotor 35 and a stator 36. The rotor 35 is connected to the first rotation shaft 7 or the second rotation shaft 8 and is provided to rotate around the axis L along with the rotation of the first rotation shaft 7 or the second rotation shaft 8. As shown in FIG. 8, the rotor 35 includes a plurality of field magnets 38 at equal intervals around the rotation axis L in a magnetized state. The field magnets 38 are provided inside a flat rotor main body 37 having a hollow structure. The second rotation shaft 8 is coupled to the center of the rotor main body 37 to be integrally rotatable with the rotor main body 37. Moreover, the field magnets 38 are a flat permanent magnet magnetized in a thickness direction (vertical direction) and are disposed such that polarities of adjacent magnets are inverted from each other.

The rotor main body 37 is configured to include a pair of rotor components facing each other in the direction of the axis L with the stator 36 interposed therebetween. Each rotor component has the same number of field magnets 38. A field magnet 38A attached to one rotor component is disposed at a position corresponding to a field magnet 38B attached to the other rotor component, and the field magnet 38A and the field magnet 38B are magnetized in orientations opposite to each other.

Figure 9:
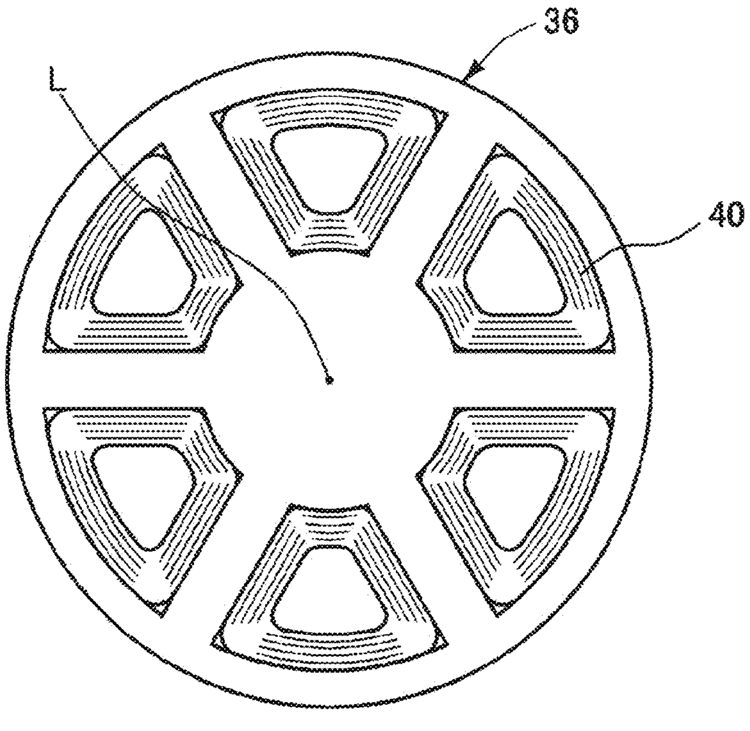
FIG. 9 is a plan view showing an arrangement of power generation coils in a stator of the power generation unit.

As shown in FIG. 9, the stator 36 includes a plurality of power generation coils 40 excited by the field magnets 38. The power generation coils 40 are arranged to have a central axis parallel to the rotation axis L and are provided at equal intervals around the rotation axis L by the same number as the number of field magnets 38. Accordingly, the field magnets 38 and the power generation coils 40 are arranged to face each other in the direction of the rotation axis L with a gap interposed therebetween. A slip ring (not shown) is fitted in each power generation coil 40, and the power generation coil 40 is configured to output an alternating current via a brush (not shown) which comes into sliding contact with the slip ring.

Figure 14:
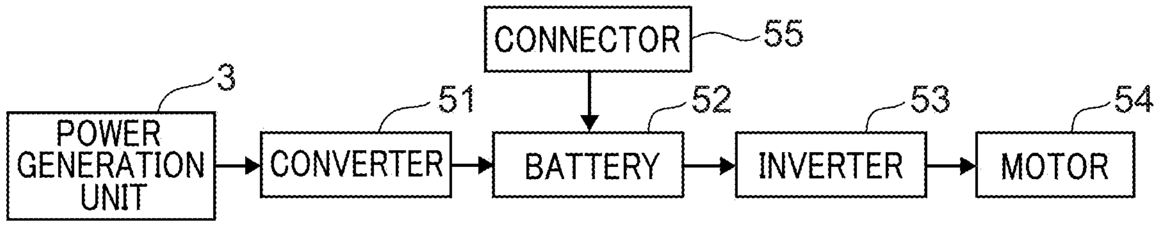
FIG. 14 is a block diagram showing an electrical configuration of the vehicle from a power generation unit of the wind power generation device to a traveling drive motor of the vehicle.

The vehicle 100 shown in FIGS. 10 and 11 is equipped with the wind power generation device 1 described above. The vehicle 100 is, for example, a passenger car. In addition, the vehicle 100 is an electric car that does not include an internal combustion engine and runs by an electric motor. That is, as shown in FIG. 14, the vehicle 100 includes a battery 52 (storage battery), an inverter 53 that converts DC power of the battery 52 into AC power, and a traveling drive motor 54 as an electric motor that rotates wheels by the AC power converted by the inverter 53. In addition, the vehicle 100 includes a connector 55 for connecting to an external power supply. The battery 52 is configured to be charged with power from an external power supply connected to the connector 55. Further, the vehicle 100 is configured to run using the electric power generated by the wind power generation device 1. That is, as shown in FIG. 14, the vehicle 100 includes a converter 51 that converts AC power generated by the power generation unit 3 of the wind power generation device 1 into DC power. The DC power converted by the converter 51 is charged in the battery 52. Moreover, in FIG. 11, a right side as viewed from a driver of the vehicle 100 is a right side of the vehicle 100, and a left side as viewed from the driver is a left side of the vehicle 100.

Figure 12:
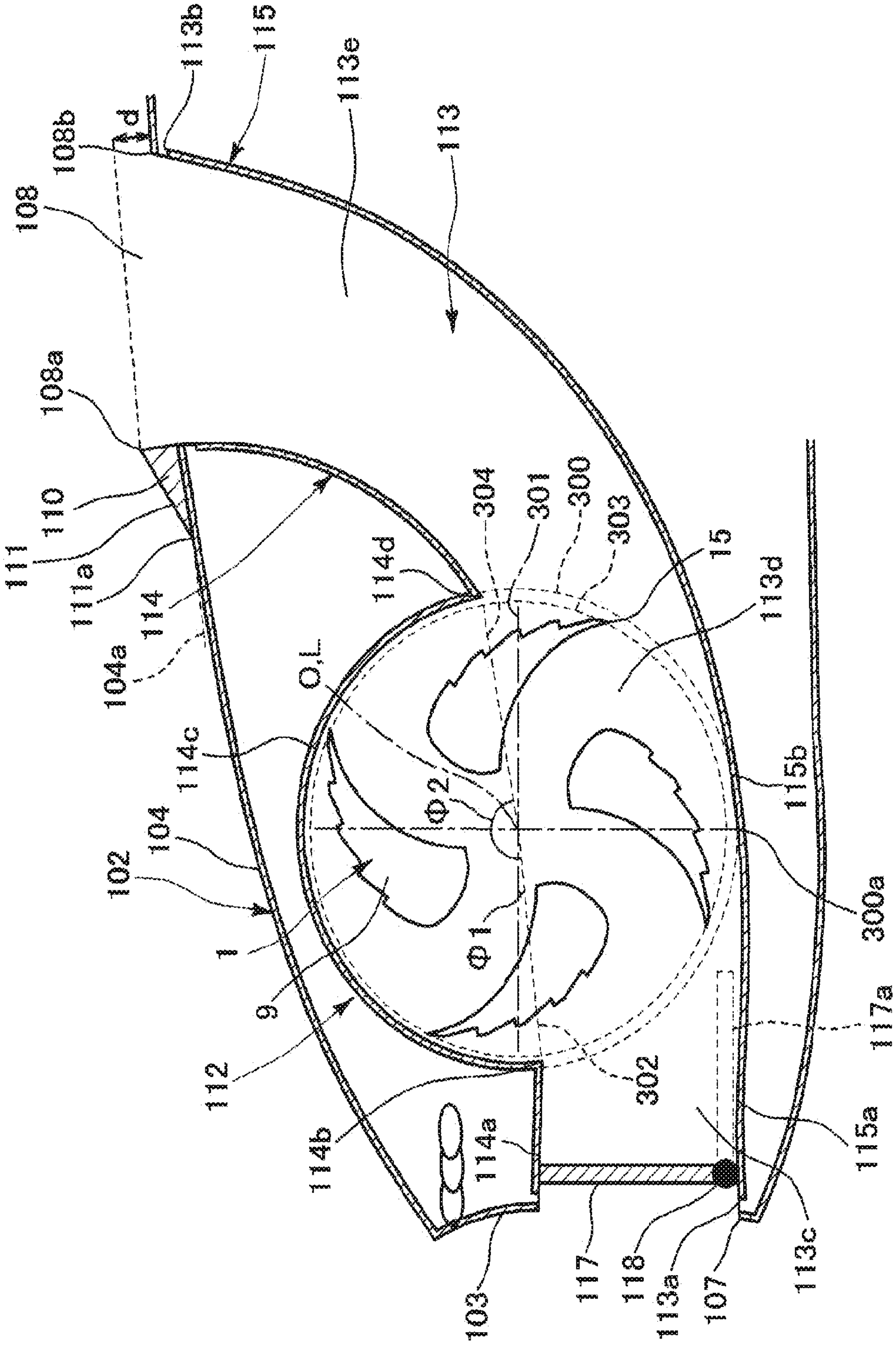
FIG. 12 is a cross-sectional view of a section which is more forward than a windshield of the vehicle in the first embodiment and is a cross-sectional view of an outer cover, an inner cover, and the rotor blades as viewed from a left surface side of the vehicle.

A vehicle body forming an outer surface of the vehicle 100 includes a front-side cover 102 as an outer cover forming an outer surface which is more forward from and below a windshield 101 (see FIGS. 10 to 13). Moreover, FIG. 12 is a cross-sectional view of the front-side cover 102 and a configuration inside the front-side cover 102 taken along a plane orthogonal to the rotation axis L of the rotor blade 9. In addition, in FIG. 13, an inner cover 112 to be described below is shown to be viewed through the front-side cover 102 from outside. The front-side cover 102 is provided to be exposed to an outer space of the vehicle 100. The front-side cover 102 includes a front surface portion 103 forming a front end surface of the vehicle 100, an upper surface portion 104 provided to extend rearward from an upper end of the front surface portion 103 and having a rear end connected to a lower end of the windshield 101, and side surface portions 105 forming part of left and right side surfaces of the vehicle 100. An accommodation space for accommodating the wind power generation device 1 and the like is formed inside the front-side cover 102.

The front surface portion 103 is provided to face an outer space in front of vehicle 100. Headlights 109 of the vehicle 100 are provided at rightward and leftward ends of the front surface portion 103 (see FIG. 11). In addition, the front surface portion 103 has a front opening 107 that electrically connects an outer space and an inner accommodation space of vehicle 100 (see FIGS. 11 to 13). The front opening 107 is formed to face the outer space in front. In the example of FIG. 11, the front opening 107 is formed below the headlight 109 but may be formed at a position between the right and left headlights 109 at a position at the same height as the headlight 109. An area of the front opening 107 is smaller than an area of an upper opening 108 to be described below, for example.

The upper surface portion 104 is a portion called a bonnet. The upper surface portion 104 forms a part of an upper surface (including the ceiling portion of the vehicle interior) of the vehicle 100. In addition, the upper surface portion 104 is rotatably provided around an axis which is directed in the vehicle width direction set at a rear end of the upper surface portion 104. That is, the upper surface portion 104 is provided to be movable upward from a closed state in FIGS. 10 to 13 with the rear end of the upper surface portion 104 as a fulcrum. When the upper surface portion 104 is opened, the inner accommodation space is exposed.

The upper surface portion 104 is provided to face the outer space above the vehicle in the closed state. More specifically, the upper surface portion 104 is configured as a surface slightly inclined with respect to a horizontal plane to be gradually displaced upward toward a rear side of the surface. In addition, the upper surface portion 104 is formed in a streamlined shape.

Figure 13:
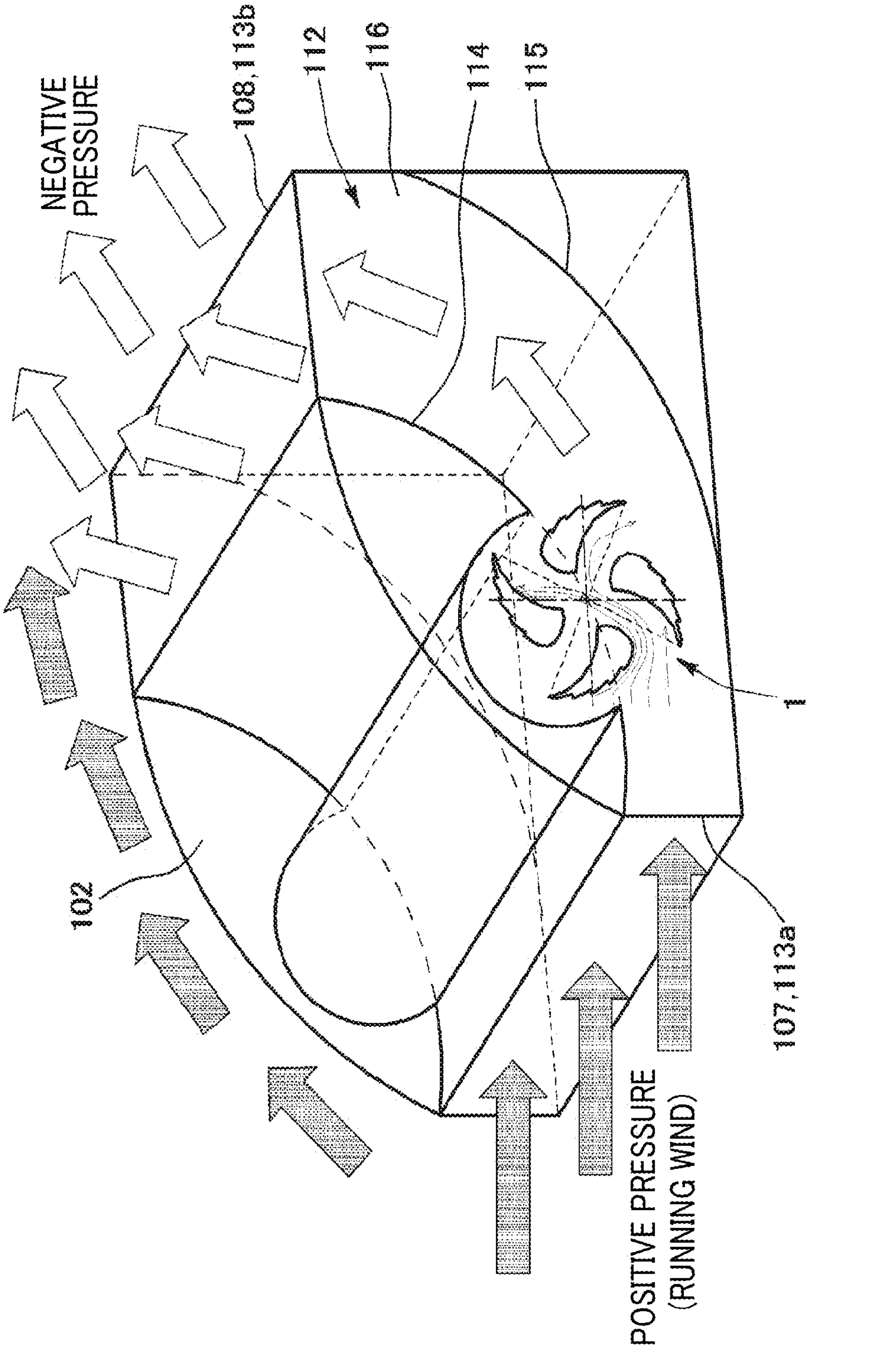
FIG. 13 is a perspective view schematically showing the outer cover, the inner cover, and the rotor blade in the first embodiment.

The upper surface portion 104 has the upper opening 108 that electrically connects the outer space and the inner accommodation space of the vehicle 100 (see FIGS. 11 to 13). The upper opening 108 is formed to face the outer space above the vehicle. In addition, the upper opening 108 is formed at a position behind and above the front space 107. In addition, the area of the upper opening 108 is larger than the area of the front opening 107, for example. As shown in FIG. 12, a front end 108*a* of upper opening 108 is positioned above a rear end 108*b* of upper opening 108. That is, the front end 108*a* is provided to form a step d above the rear end 108*b*. The step d is set to a height to the extent that the view of the driver of the vehicle 100 is not blocked and is set to, for example, more than 0 cm and 20 cm or less. Moreover, the front end 108*a* and the rear end 108*b* may be formed at the same vertical position. That is, the step d may be 0 cm.

The upper surface portion 104 has a step forming portion 110 at a position adjacent to the upper opening 108 on the front side of the upper opening 108 (see FIG. 12). The step forming portion 110 is provided over the entire range of a horizontal width of the opening 108, for example, and may be provided only in a partial range of the horizontal width. The step forming portion 110 has an upper inclined surface 111 that is gradually displaced upward toward the rear side. An inclination angle of the upper inclined surface 111 with respect to a horizontal plane (plane parallel to a ground contact surface of the vehicle 100) is larger than an inclination angle of a tangent plane 104*a* of the upper surface portion 104 at a front end 111*a* of the upper inclined surface 111 with respect to the horizontal plane. A rear end of the upper inclined surface 111 functions as the front end 108*a* of the opening 108. The inclination angle of the upper inclined surface 111 with respect to the upper surface portion 104 is set to, for example, 45 degrees or smaller. Accordingly, it is possible to prevent the step forming portion 110 (upper inclined surface 111) from causing air resistance. The step forming portion 110 functions as an angle changing portion that changes a surface angle of the upper surface portion 104, in other words, functions as an angle changing portion that changes the angle of the upper surface portion 104 with respect to the horizontal plane (in other words, a plane parallel to the ground contact surface of the vehicle 100) to a larger angle toward the upper side. In addition, the step forming portion 110 functions as a flow direction changing portion that changes a flow direction of wind flowing from the front side along the upper surface portion 104 to an upward direction (strictly, obliquely upward direction). The step forming portion 110 may be configured separately from a plate member constituting the upper surface portion 104 or may be configured as a part of the plate member.

The vehicle 100 includes an inner cover 112 as a passage forming unit in an accommodation space inside the front-side cover 102 (See FIGS. 10, 12, and 13). The inner cover 112 functions as a duct that forms a passage 113 for guiding wind that enters from the front opening 107 to the upper opening 108. The wind power generation device 1 is disposed in the passage 113 such that the rotation axis L is parallel to the right-left direction of the vehicle 100, in other words, perpendicular to a vertical direction and a front-rear direction of the vehicle 100.

The inner cover 112 includes an upper surface portion 114 forming an upper surface of the passage 113, a lower surface portion 115 forming a lower surface, and side surface portions 116 forming right and left side surfaces. The upper surface portion 114 and the lower surface portion 115 are configured as, for example, plates parallel to a virtual right-left horizontal line (line parallel to the rotation axis L of the wind power generation device 1) extending horizontally in the right-left direction (vehicle width direction). The side surface portion 116 is configured as, for example, a plate perpendicular to the right-left horizontal line.

As shown in FIG. 12, an inlet 113*a* of the passage 113 is provided at a position facing the front opening 107. Since the inlet 113*a* is provided at a position slightly separated from the front surface portion 103 of the outer cover 102, a slight gap may be formed between the inlet 113*a* and the front opening 107. In this case, the gap is preferably small, for example, preferably 5 cm or smaller, and more preferably 2 cm or smaller. Alternatively, since the inlet 113*a* is provided at a position in contact with the front surface portion 103 of the outer cover 102, there may be no gap between the inlet 113*a* and the front opening 107. In addition, the inlet 113*a* may be formed in the same shape as the front opening 107, and the inlet 113*a* may be provided in a state in which the position of the inlet 113*a* and the position of the front opening 107 completely coincide with each other. That is, the inlet 113*a* and the front opening 107 may completely coincide with each other.

In addition, the inlet 113*a* may be formed in the same shape as the front opening 107 or may be formed in a different shape. In addition, an area (size) S1 of the inlet 113*a* may be the same as an area of the front opening 107, may be smaller than the area of the front opening 107, or may be larger than the area of the front opening 107. In addition, the area (size) S1 of the inlet 113*a* is smaller than an area S2 of an outlet 113*b* of the passage 113. In addition, the area (size) S1 of the inlet 113*a* is smaller than the area of the upper opening 108.

The outlet 113*b* of the passage 113 is provided at a position facing the upper opening 108. There may be a slight gap or no gap between the outlet 113*b* and the upper opening 108. When there is a gap, the gap is, for example, preferably 5 cm or smaller, and more preferably 2 cm or smaller. In addition, the outlet 113*b* may be formed in the same shape as the upper opening 108, and the outlet 113*b* may be provided in a state in which the position of the outlet 113*b* and the position of the upper opening 108 completely coincide with each other. That is, the outlet 113*b* and the upper opening 108 may completely coincide with each other.

In addition, the outlet 113*b* may be formed in the same shape as the upper opening 108 or may be formed in a different shape. In addition, an area (size) S2 of the outlet 113*b* may be the same as the area of the upper opening 108, may be smaller than the area of the upper opening 108, or may be larger than the area of the upper opening 108. The area S2 of the outlet 113*b* is larger than the area S1 of the inlet 113*a*. In addition, the area S2 of the outlet 113*b* is smaller than the area of the front opening 107.

The passage 113 has no opening other than the inlet 113*a* and the outlet 113. As shown in FIG. 12, the passage 113 includes an inlet-side passage 113*c* positioned between the inlet 113*a* and a space 113*d* in which the wind power generation device 1 is accommodated, an intermediate passage 113_d_ in which the wind power generation device 1 is accommodated, and an outlet-side passage 113_e_ positioned between the intermediate passage 113_d_ and the outlet 113_b_.

A portion 114_a_ (inlet-side upper surface portion) of the upper surface portion 114 of the passage 113 which forms an upper surface of the inlet-side passage 113_c_ is provided substantially parallel to a virtual horizontal plane 301, which is a virtual plane parallel to both the front-rear direction and the right-left direction of the vehicle 100, at substantially the same vertical position as a center O of a virtual circle 300 formed by an arcuate portion 114_c_ to be described below when viewed in the cross-section of FIG. 12 (cross-section perpendicular to the right-left direction). A rear end 114_b_ of the inlet-side upper surface portion 114_a_ may be provided at the same vertical position as the center O of the virtual circle 300, may be provided at a position slightly above the center O, or may be provided at a position slightly below the center O. Specifically, an angle formed by a virtual straight line 302 connecting the rear end 114_b_ and the center O and the virtual horizontal plane 301 including the center O in the plane is represented by "q1", the angle q1 has a positive sign when the rear end 114_b_ is positioned above the virtual horizontal plane 301, and the angle q1 has a negative sign when the rear end 114_b_ is positioned below the virtual horizontal plane 301. In this case, the angle q1 is set to, for example, −10 degrees or larger and +10 degrees or smaller, preferably −5 degrees or larger and +5 degrees or smaller, and more preferably −2 degrees or larger and +2 degrees or smaller.

A portion 115_a_ (inlet-side lower surface portion) of the lower surface portion 115 of the passage 113 which forms a lower surface of the inlet-side passage 113_c_ is provided substantially parallel to the virtual horizontal plane 301 at substantially the same vertical position as a point positioned at the lowermost side of the virtual circle 300. In addition, the inlet-side lower surface portion 115_a_ is provided substantially parallel to the inlet-side upper surface portion 114_a_ at a position lower than the inlet-side upper surface portion 114_a_.

As described above, the inlet-side passage 113_c_ is formed to be electrically connected to a region below the virtual horizontal plane 301 including the center O in the plane in a region 113_d_ (intermediate passage 113_d_) surrounded by the virtual circle 300. Moreover, a cross-sectional area (for example, a width in the vertical direction or a width in the right-left direction of the inlet-side passage 11_c_) of the inlet-side passage 113_c_ perpendicular to an air flow direction may be constant in the flow direction, may gradually decrease in the flow direction, or may gradually increase in the flow direction.

A portion 114_c_ (intermediate upper surface portion) of the upper surface portion 114 of the passage 113 which forms an upper surface of the intermediate passage 113_d_ is formed in an arcuate shape around a point on the virtual right-left horizontal line extending in the right-left direction of the vehicle 100, as the center O when viewed in the cross-section of FIG. 12. The arcuate portion 114_c_ as the intermediate upper surface portion may be formed as an arc of a circle or an arc of an ellipse.

The arcuate portion 114_c_ is formed in a shape along a virtual circle 303 (hereinafter, sometimes referred to as a rotation locus circle) indicating a rotation locus of the outer end portion 15 of the rotor blade 9 disposed in the intermediate passage 113_d_. In addition, the arcuate portion 114_c_ is provided in a covering state so as not to expose a region above the rotation axis L of a region surrounded by the rotation locus circle 303 with respect to the inlet-side passage 113_c_ (in other words, when viewed from the front opening 107 or the inlet 113_a_). More specifically, a central angle q2 of the arcuate portion 114_c_ is set to, for example, 90 degrees or larger and 180 degrees or smaller. Moreover, the central angle q2 is an angle formed by the virtual straight line 302 connecting the front end 114_b_ of the arcuate portion 114_c_ (also a rear end of the inlet-side upper surface portion 114_a_) and the center O and a virtual straight line 304 connecting the rear end 114_d_ of the arcuate portion 114_c_ and the center O. The rear end 114_d_ of the arcuate portion 114_c_ may be provided on the virtual horizontal plane 301 including the center O in the plane, may be provided above the virtual horizontal plane 301, or may be provided slightly below the virtual horizontal plane 301 as long as the central angle q2 falls in a range of 90 degrees or larger and 180 degrees or smaller.

In addition, a curvature radius r1 of the arcuate portion 114_c_ (in other words, a radius of the virtual circle 300) is set to a value slightly larger than a radius r2 of the rotation locus circle 303. Specifically, the curvature radius r1 of the arcuate portion 114_c_ is, for example, 100% of the radius r2 of the rotation locus circle 303 and is set to 130% or less thereof. That is, an expression of $1.0\times r2<r1\leq 1.3\times r2$ is established.

The portion 115_b_ (intermediate lower surface portion) of the lower surface portion 115 of the passage 113 which forms the lower surface of the intermediate passage 113_d_ is provided to pass through a point 300_a_ (lowermost point) at the lowermost position of points on the virtual circle 300, or to pass through a position slightly below the lowermost point 300_a_ (specifically, for example, a position where a difference from the lowermost point 300_a_ is 30% or less of a diameter of the virtual circle 300).

The outlet-side passage 113_e_ is formed in a curved shape to be gradually displaced upward toward the rear side. Moreover, a cross-sectional area of the outlet-side passage 113_e_ perpendicular to an air flow direction may be constant in the flow direction, may gradually decrease in the flow direction, or may gradually increase in the flow direction.

In the intermediate passage 113_d_, the wind power generation device 1 is disposed at a position where the rotation axis L is directed in the right-left direction of the vehicle 100 and the rotation axis L coincides with the center O of the arcuate portion 114_c_. More specifically, as viewed in the cross-section of FIG. 12 (a side cross-section viewed from the left surface side of the vehicle 100), the rotor blades 9 are provided to rotate counterclockwise. In other words, the rotation direction of the rotor blade 9 is determined such that the rotor blade 9 moves forward as moving from the upper side to the lower side, and then moves rearward.

Further, as shown in FIG. 12, the vehicle 100 includes an opening/closing unit 117 that switches between a state in which the inlet-side passage 113_c_ is opened and a state in which the inlet-side passage is closed. The opening/closing unit 117 is provided at the position of the front opening 107, the position of the inlet 113_a_, or the position in the inlet-side passage 113_c_ downstream from the inlet 113_a_. The opening/closing unit 117 has, for example, a rotation shaft 118 directed in the right-left direction of the vehicle at a lower end of the opening/closing unit 117, and the opening/closing unit is provided rotatably around the rotation shaft 118. Moreover, FIG. 12 shows a state in which the opening/closing unit 117 closes the inlet-side passage 113_c_. In addition, in FIG. 12, a position of the opening/closing unit 117 which is opened is indicated by a broken line 117_a_. From the state of FIG. 12, the opening/closing unit 117 rotates downward and rearward about the rotation shaft 118 as a fulcrum, so that the inlet-side passage 113_c_ is opened.

Figure 15:
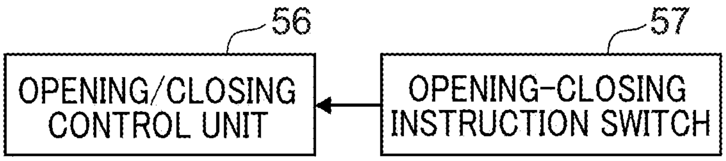
FIG. 15 is a block diagram showing an electrical configuration of the vehicle related to opening/closing control of a passage of the inner cover.

As shown in FIG. 15, the vehicle 100 includes an opening/closing control unit 56 that controls opening/closing of the opening/closing unit 117, and an opening/closing instruction switch 57 that instructs opening/closing of the opening/closing unit 117. The opening/closing control unit 56 includes a motor or the like for rotating the rotation shaft 118. The opening/closing instruction switch 57 is an operation unit provided around the driver's seat of the vehicle 100 and operated by a driver of the vehicle 100. The opening/closing instruction switch 57 is configured to be switchable between a first position and a second position, for example. Accordingly, the opening/closing control unit 56 causes the opening/closing unit 117 to enter into an opened state when the opening/closing instruction switch 57 is at the first position and causes the opening/closing unit 117 to enter into a closed state when the opening/closing instruction switch 57 is at the second position. Moreover, the opening/closing unit 17, the opening/closing control unit 56, and the opening/closing instruction switch 57 correspond to a distribution control unit of the disclosure.

Moreover, the converter 51, the battery 52, the inverter 53, the motor 54, and the opening/closing control unit 55 shown in FIGS. 14 and 15 may be provided at any position of the vehicle 100, may be provided on the front side (in the front-side cover 102) of the vehicle 100, or may be provided on the rear side.

Figure 16:
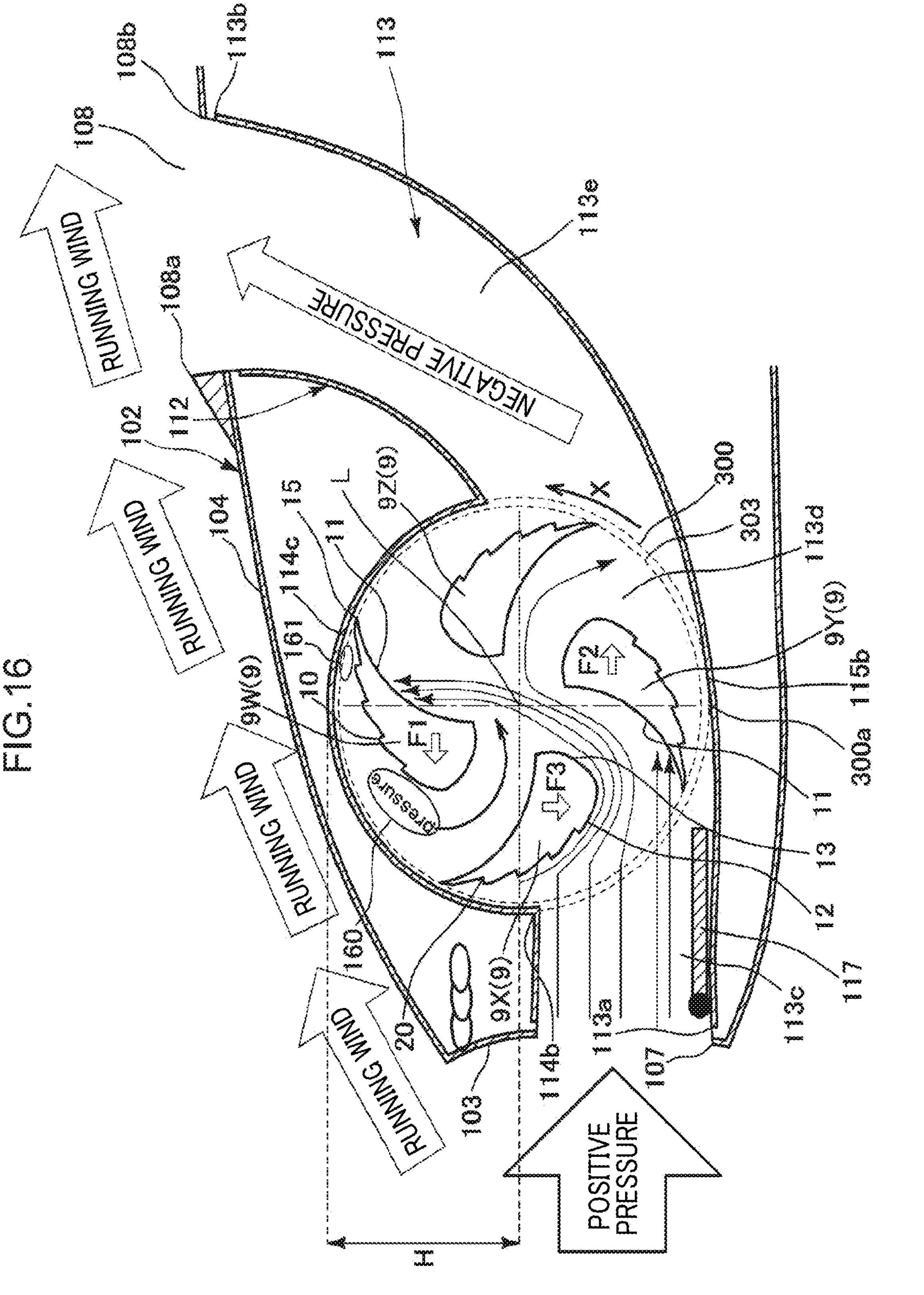
FIG. 16 is a cross-sectional view of the outer cover, the inner cover, and the rotor blade in the first embodiment as viewed from the left surface side of the vehicle, showing a flow of air (wind) during traveling of the vehicle.
Figure 17:
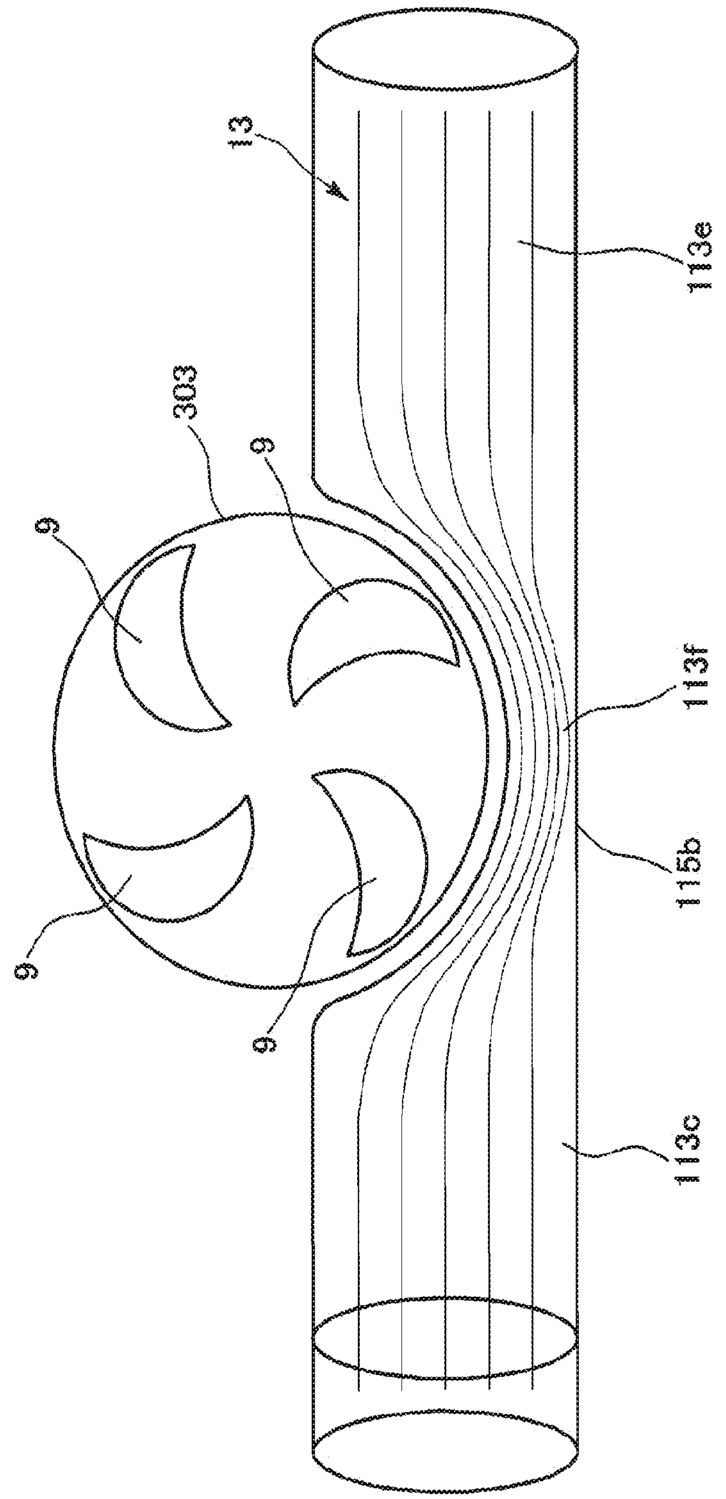
FIG. 17 is a view schematically showing a state in which a middle portion (a portion where the rotor blade is disposed) of the passage of the inner cover is narrowed by the rotor blades.

Hereinafter, functions and effects of the embodiment will be described with reference to FIGS. 16 and 17. FIG. 16 shows the four rotor blades 9 of the first rotation unit 4 or the second rotation unit 5 of the wind power generation device 1 on a cross-section similar to that of FIG. 12. The four rotor blades 9 are appropriately distinguished by assigning a sign to the rotor blade positioned closest to the front opening 107, of the four rotor blades 9, as "9X" and assigning signs to the remaining rotor blades arranged in the rotation direction from the rotor blade 9X as "9Y", "9Z", and "9W" in order. In addition, in FIG. 16, the flow of wind entering from the front opening 107 is indicated by a line with an arrow at the tip. In addition, FIG. 16 shows a state in which the opening/closing unit 117 is opened.

A part of the wind that has entered the passage 113 from the front opening 107 hits the first curved surface 12 of the rotor blade 9X, flows toward the side of the rotation direction X along the surface 12, and then meanders into a space between the second curved surface 13 of the rotor blade 9X and the rear blade surface 11 of the adjacent rotor blade 9Y positioned adjacent in front. Most of the meandering wind hits the rear blade surface 11 of the rotor blade 9W. As a result, drag F1 in the rotation direction X can be generated with respect to the rotor blade 9W.

In addition, a part of the wind that has meandered into the space between the rotor blade 9X and the rotor blade 9Y via the first curved surface 12 of the rotor blade 9X hits the rear blade surface 11 of the rotor blade 9Y. In addition, a part of the wind entering the passage 113 from the front opening 107 directly hits the rear blade surface 11 of the rotor blade 9Y (without passing via the first curved surface 12 of the rotor blade 9X). As a result, drag F2 in the rotation direction X can be generated with respect to the rotor blade 9Y.

Further, a part of the wind flowing toward the side of the rotation direction X along the first curved surface 12 of the rotor blade 9X hits the recess 20 formed in the first curved surface 12. As a result, drag F3 in the rotation direction X can be generated with respect to the rotor blade 9X. In particular, since the plurality of recesses 20 are provided to be distributed over the entire first curved surface 12, the drag F3 can be increased in strength and the duration time of the drag F3 can be prolonged.

In addition, as shown in FIG. 5, the first inner side surface 21 of the recess 20 faces the rear side in the rotation direction X, and the inclination angle θ3 of the second inner side surface 22 with respect to the main surface 23 or the virtual curved surface 24 is smaller than the inclination angle θ1 of the first inner side surface 21 with respect to the main surface 23 or the virtual curved surface 24. Hence, the wind flowing along the first curved surface 12 can be guided from the second inner side surface 22 to the first inner side surface 21 and effectively received by the first inner side surface 21. As a result, the drag F3 in the rotation direction X can be effectively generated.

In addition, since the inclination angle θ1 (see FIG. 5) of the first inner side surface 21 is, for example, 60 degrees or larger and 150 degrees or smaller, and preferably 90 degrees or larger and 150 degrees or smaller, the first inner side surface 21 is likely to receive the wind flowing along the first curved surface 12 at an angle perpendicular or close to a right angle to the surface 21 even if an orientation of the recess 20 is changed as the first inner side surface rotates in the direction X. As a result, the duration time of the drag F3 can be prolonged.

In addition to the position of the rear blade surface 11 in the rotation direction X, drag is also generated at a position (recess 20) different from the rear blade surface 11, so that it is possible to suppress fluctuation of the drag generated in the rotor blade 9 with respect to the position (in other words, the rotation angle) around the rotation axis L.

In addition, since the first inner side surface 21 of the recess 20 faces the rear side in the rotation direction X, and the inclination angle θ3 (see FIG. 5) of the second inner side surface 22 with respect to the main surface 23 or the virtual curved surface 24 is an angle smaller than the inclination angle θ1 (see FIG. 5) of the first inner side surface 21 with respect to the main surface 23 or the virtual curved surface 24, it is possible to suppress drag that causes the rotor blade 9 to rotate in the opposite direction of the rotation direction X even if wind flows to the opposite side of the rotation direction X along the first curved surface 12.

In addition, a region above the rotation axis L in the accommodation space 113*d* (intermediate passage) of the rotor blade 9 is a region in which a headwind for the rotor blade 9 is generated. Since this region is hidden by the arcuate portion 114*c* when viewed from the inlet-side passage 113*c*, it is possible to suppress the wind from the inlet-side passage 113*c* from hitting the front blade surface 10 of the rotor blade 9 (rotor blade 9W in FIG. 16) positioned above the accommodation space 113*d*. As a result, it is possible to suppress the headwind from hitting the rotor blade 9, and it is possible to suppress the air resistance that hinders the rotation of the rotor blade 9.

Since the front end 114*b* of the arcuate portion 114*c* is at substantially the same vertical position as the rotation axis L, and the central angle q2 (see FIG. 12) of the arcuate portion 114*c* is 90 degrees or larger, it is possible to effectively hide an upper region of the accommodation space 113*d* when viewed from the inlet-side passage 113*c*. In addition, since the central angle q2 is 180 degrees or smaller, it is possible to suppress a decrease of a flow channel cross-sectional area at a boundary between the accommodation space 113*d* and the outlet-side passage 113*e*. As a result, the wind can easily flow from the accommodation space 113*d* (rotor blade 9) to the outlet-side passage 113*e*, the flow efficiency of the wind from the front opening 107 to the upper opening 108 can be improved, and the rotation efficiency of the rotor blade 9 can be improved.

In addition, since the arcuate portion 114*c* is formed in an arcuate shape along a circumference of the rotor blade 9 around the rotation axis L, air 160 (see FIG. 16) between the arcuate portion 114*c* and the front blade surface 10 of the rotor blade 9 can meander toward the rotation axis L and hit the rear blade surface 11 of the rotor blade 9. That is, the air in the accommodation space 1113*d* can be effectively used for the rotation of the rotor blade 9. In particular, since the curvature radius r1 of the arcuate portion 114*c* is set to a value slightly larger than the radius r2 of the rotation locus circle 303 (specifically, $1.0 \times r2 < r1 \leq 1.3 \times r2$), the air 160 can effectively meander toward the rotation axis L. In addition, since the air 160 meanders toward the rotation axis L, the air pressure between the arcuate portion 114*c* and the front blade surface 10 of the rotor blade 9 can be reduced, that is, air resistance that hinders the rotation of the rotor blade 9 can be reduced, and the rotation efficiency of the rotor blade 9 can be improved.

Further, as shown in FIGS. 2 and 6, the outer end portion 15 of the rotor blade 9 has the plurality of recesses 32, which penetrate a portion between the first curved surface 12 and the rear blade surface 11, in the direction in which the outer end portion 15 extends, so that air 161 (see FIG. 16) present near the outer end portion 15 on the first curved surface 12 side can be released to the rear blade surface 11 side through the recesses 32. As a result, the pressure of the air 161 can be reduced, that is, the air resistance that hinders the rotation of the rotor blade 9 can be reduced, and the rotation efficiency of the rotor blade 9 can be improved. In particular, since the vicinity of the outer end portion 15 is positioned separate from the rotation axis L, the moment of force acting in a direction in which the rotation of the rotor blade 9 is hindered by the resistance of the air 161*b* tends to increase. However, the presence of the recesses 32 can reduce the moment of force.

In addition, since the periphery of the rotor blade 9 is surrounded by the inner cover 112, the air outside the rotor blade 9 hits an inner wall of the inner cover 112 due to the rotation of the rotor blade 9, and a sound is produced. However, the recesses 32 enable the hitting of the air outside the rotor blade 9 against the inner wall of the inner cover 112 to be weakened. As a result, noise produced by the rotation of the rotor blade 9 can be reduced.

In addition, since the intermediate lower surface portion 115*b* of the passage 113 is provided to pass through the lowermost point 300*a* on the virtual circle 300 or pass through a position slightly below the lowermost point 300*a*, a flow channel between the rotation locus circle 303 and the intermediate lower surface portion 115*b* can be reduced. Here, FIG. 17 schematically shows that the passage 113 is narrowed by the rotation locus circle 303 and the intermediate lower surface portion 115*b*. As shown in FIG. 17, since the intermediate lower surface portion 115*b* is provided at a position close to the rotation locus circle 303, a cross-sectional area of a flow channel 113*f* between the intermediate lower surface portion 115*b* and the rotation locus circle 303 is smaller than each cross-sectional area of each of the inlet-side passage 113*c* and the outlet-side passage 113*e*. As a result, the kinetic energy (flow velocity) of the air flowing through the flow channel 113*f* can be increased according to Bernoulli's theorem, and the rotational speed (rotational force) of the rotor blade 9 can be increased.

In addition, since the rotor blades 9 are provided to rotate counterclockwise when viewed from the left surface side of the vehicle 100, the arcuate portion 114*c* can be disposed above the front opening 107, in other words, the front opening 107 can be disposed below the arcuate portion 114*c*. Since the front opening 107 is disposed below, a height of the front opening 107 and the inlet-side passage 113*c* connected to the front opening can be made equal to a height of a lower half of the accommodation space 113*d* of the rotor blade 9, and wind can be efficiently supplied to the lower side of the accommodation space 113*d*. In addition, although the headlight 109 is provided above the front surface portion 103 where the front opening 107 is formed (see FIG. 11), the degree of freedom in the shape and size of the front opening 107 can be increased by forming the front opening 107 on the lower side where the headlight 109 is not provided.

On the other hand, if the rotor blade 9 is provided to rotate clockwise as viewed from the left surface side of the vehicle 100, the front opening is provided above the arcuate portion. In this case, it is difficult to provide the front opening having the same height as a height H (see FIG. 16) of an upper half of the accommodation space 113*d* above the front surface portion 103.

In addition, since the front opening 107 faces the outer space in the forward direction (front) of the vehicle 100, running wind can be efficiently taken into the passage 113. In addition, the pressure of the running wind taken in from the front opening 107 is a positive pressure higher than the surrounding air pressure. The air in the passage 113 is pushed downstream (upper opening 108 side) by the running wind of the positive pressure, so that the flow velocity of the wind in the passage 113 can be increased.

In addition, as shown in FIG. 10, since the upper surface of the vehicle 100 has a convex shape with respect to an undersurface and is formed in a streamlined shape, the pressure of the running wind flowing along the upper surface (including the upper surface portion 104 of the outer cover 102) tends to be a negative pressure lower than the surrounding air pressure. The air in the passage 113 can be sucked to the upper opening 108 side by the negative pressure (See FIGS. 10, 13, and 16). In addition, through the duct 112 (inner cover) from the front surface portion 103 to the upper surface portion 104 of the vehicle 100, the air resistance received by the front surface portion 103 can be reduced. In addition, the negative pressure acting on the upper surface portion 104 exceeds the positive pressure acting on the front surface portion 103, and the wind speed in the duct 112 can be accelerated.

As described above, the positive pressure in the front opening 107 and the negative pressure in the upper opening 108 can increase the flow velocity of the air in the passage 113 and increase the rotation speed of the rotor blade 9. If the negative pressure does not act, the energy of the air introduced from the front opening 107 into the passage 113 is used for the rotation of the rotor blade 9, and as a result, the flow velocity of the air in the outlet-side passage 113*e* is decreased. In addition, as shown in FIG. 17, when the flow channel 113*f* between the intermediate lower surface portion 115*b* and the rotation locus circle 303 is narrowed, the kinetic energy (flow velocity) of the air in the outlet-side passage 113*e* decreases according to Bernoulli's theorem. However, since the negative pressure from the upper opening 108 acts on the outlet-side passage 113*e*, the flow velocity of the air in the outlet-side passage 113*e* can be increased.

In addition, since the area S2 of the outlet 113*b* of the passage 113 is larger than the area S1 of the inlet 113*a*, the air passing through the rotor blade 9 can be efficiently discharged from the upper opening 108 through the outlet-side passage 113*e*. As a result, the air flow efficiency in the passage 113 can be increased, and the rotation efficiency of the rotor blade can be improved.

In addition, since the front end 108*a* of the upper opening 108 is positioned above the rear end 108*b*, the running wind flowing from the front side along the upper surface portion 104 of the outer cover 102 hits the rear end 108*b*, and it is possible to suppress generation of turbulence in the vicinity of the upper opening 108. As a result, a negative pressure level of the upper opening 108 can be increased.

In addition, since the step forming portion 110 having the upper inclined surface 111 is provided in front of the upper opening 108, the flow direction of the front wind flow flowing along the upper surface portion 104 can be changed to an obliquely upward direction. As a result, the air pressure in the vicinity of the upper opening 108 can be lowered, and the negative pressure level of the upper opening 108 can be increased. In other words, since the angle changing portion which is the step forming portion 110 is formed in front of the upper opening 108, a strong vortex of air is generated in the vicinity of the upper opening 108 by the angle changing portion 108, and the vortex causes the air pressure of the upper opening 108 to become a negative pressure.

The rotation device 2 is divided into the first rotation unit 4 and the second rotation unit 5 provided in the same rotation direction. In addition, since the first rotation unit 4 and the second rotation unit 5 have an angle difference of 45 degrees in the circumferential direction around the rotation axis L, it is possible to reduce the fluctuation of the drag (rotational torque) with respect to the rotation angle of the entire rotation device 2. That is, even in a case where the first rotation unit 4 is at a rotational position where the drag is unlikely to be produced, a drop of the drag can be suppressed by the second rotation unit 5 provided with an angle difference of 45 degrees in the rotation direction. As a result, the rotation efficiency of the rotation device 2 can be improved.

In addition, since the first rotation unit 4 and the second rotation unit 5 are provided at different positions in the direction of the rotation axis L, the space between the rotor blades in the direction around the rotation axis L can be increased as compared with a structure in which eight rotor blades are arranged at the same position in the direction of the rotation axis L at equal intervals. As a result, it is possible to cause the wind to easily flow between the rotor blades.

When the rotation device 2 rotates during traveling of the vehicle 100, power can be generated by the power generation unit 3. Since the generated power is charged in the battery 52 (see FIG. 14), a travelable distance of the electric car 100 can be increased.

In addition, when the rotor blades 9 rotate during traveling of the vehicle 100, a downward force (downforce) can be applied to the vehicle 100 by the Magnus effect. As a result, the traveling of the vehicle 100 can be stabilized.

In addition, since the inlet-side passage 113*c* includes the opening/closing unit 117 (see FIG. 12), it is possible to suppress infiltration of foreign matter into the passage 113 by closing the opening/closing unit 117, and it is possible to suppress adhesion of foreign matter to the inner wall of the passage 113 or the rotor blade 9. For example, by closing the opening/closing unit 117 when snow is falling or sand is flying, it is possible to suppress infiltration of snow and sand into the passage 113.

In addition, since the switch 57 that instructs opening and closing of the opening/closing unit 117 is provided (see FIG. 15), the opening and closing of the opening/closing unit 117 can be switched at a timing desired by the driver.

In addition, since the vehicle 100 is configured as the electric car without an internal combustion engine, it is easy to secure a space for disposing the inner cover 112 and the wind power generation device 1 in the front-side cover 102.

Second Embodiment

Figure 18:
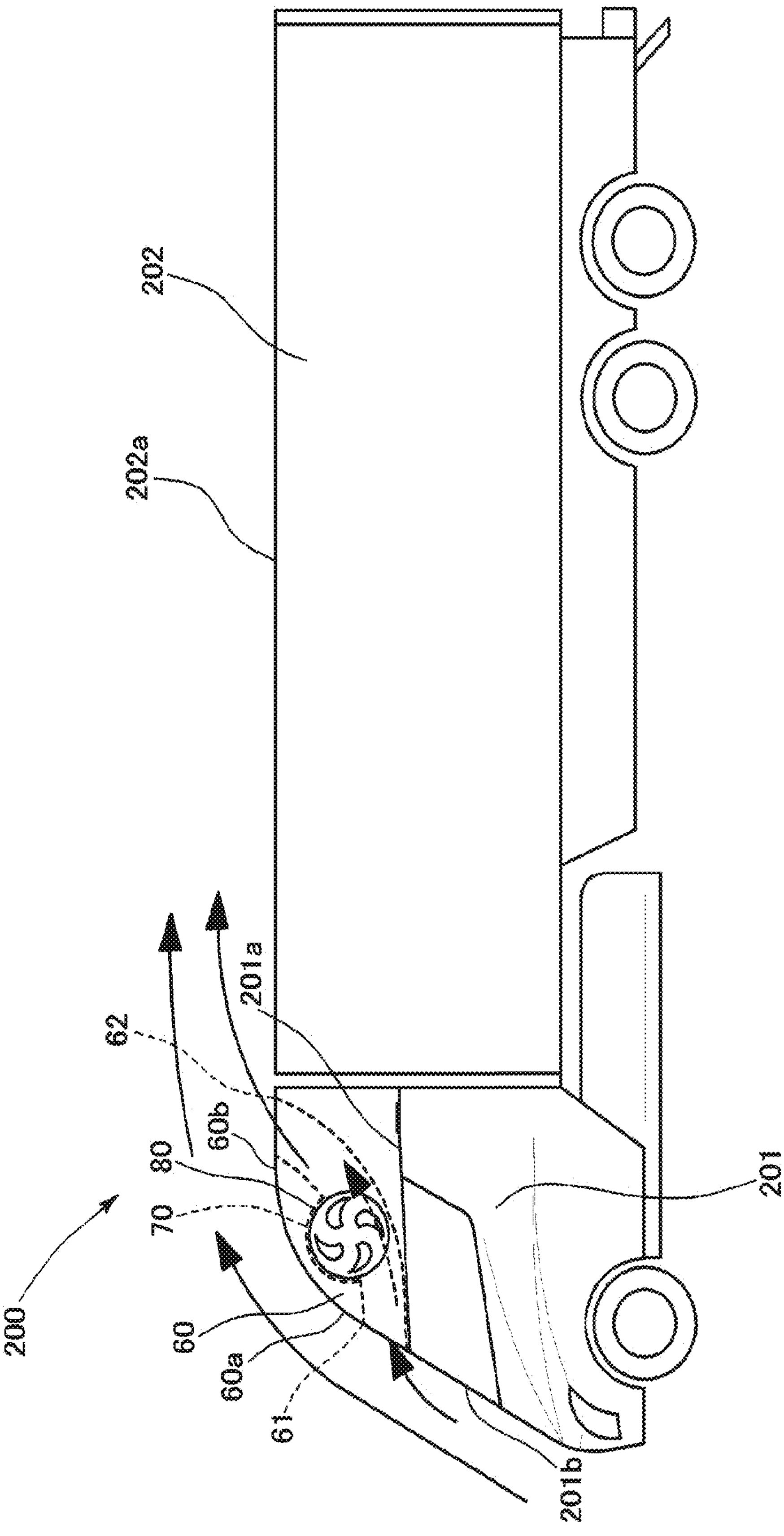
FIG. 18 is a left side view of a vehicle of a second embodiment.

Next, a second embodiment of the disclosure will be described focusing on sections different from the first embodiment. FIG. 18 is a side view of a vehicle according to the embodiment. A vehicle 200 of FIG. 18 is a cargo vehicle (so-called truck) including a vehicle body 201 forming a seat space (occupant compartment) for occupants including a driver and a cargo accommodation compartment 202 connected to a posterior section of the vehicle body 201. In addition, the vehicle 200 may be configured as an electric car similarly to the first embodiment, may be configured as a vehicle that obtains power only by an internal combustion engine (engine), or may be configured as a hybrid car that obtains power by both an internal combustion engine and an electric motor. A front surface 201*b* including a windshield of the vehicle body 201 is formed in, for example, an inclined shape that is gradually displaced rearward toward the upper side. However, the front surface 201*b* may be formed into a surface substantially perpendicular to a horizontal line extending in a front-rear direction of the vehicle 200. A ceiling portion 201*a* of the occupant compartment formed in the vehicle body 201 is provided at a position lower than the upper surface 202*a* (ceiling portion) of the cargo accommodation compartment 202.

The cargo accommodation compartment 202 forms a box-shaped accommodation chamber for accommodating cargo. The cargo accommodation compartment 202 is configured as a separate vehicle body from the vehicle body 201. The upper surface 202*a* of the cargo accommodation compartment 202 is positioned above an occupant compartment ceiling portion 201*a* that blocks the upper side of the occupant compartment of the vehicle body 201. In addition, the upper surface 202*a* is formed as a surface parallel to the ground contact surface.

Figure 19:
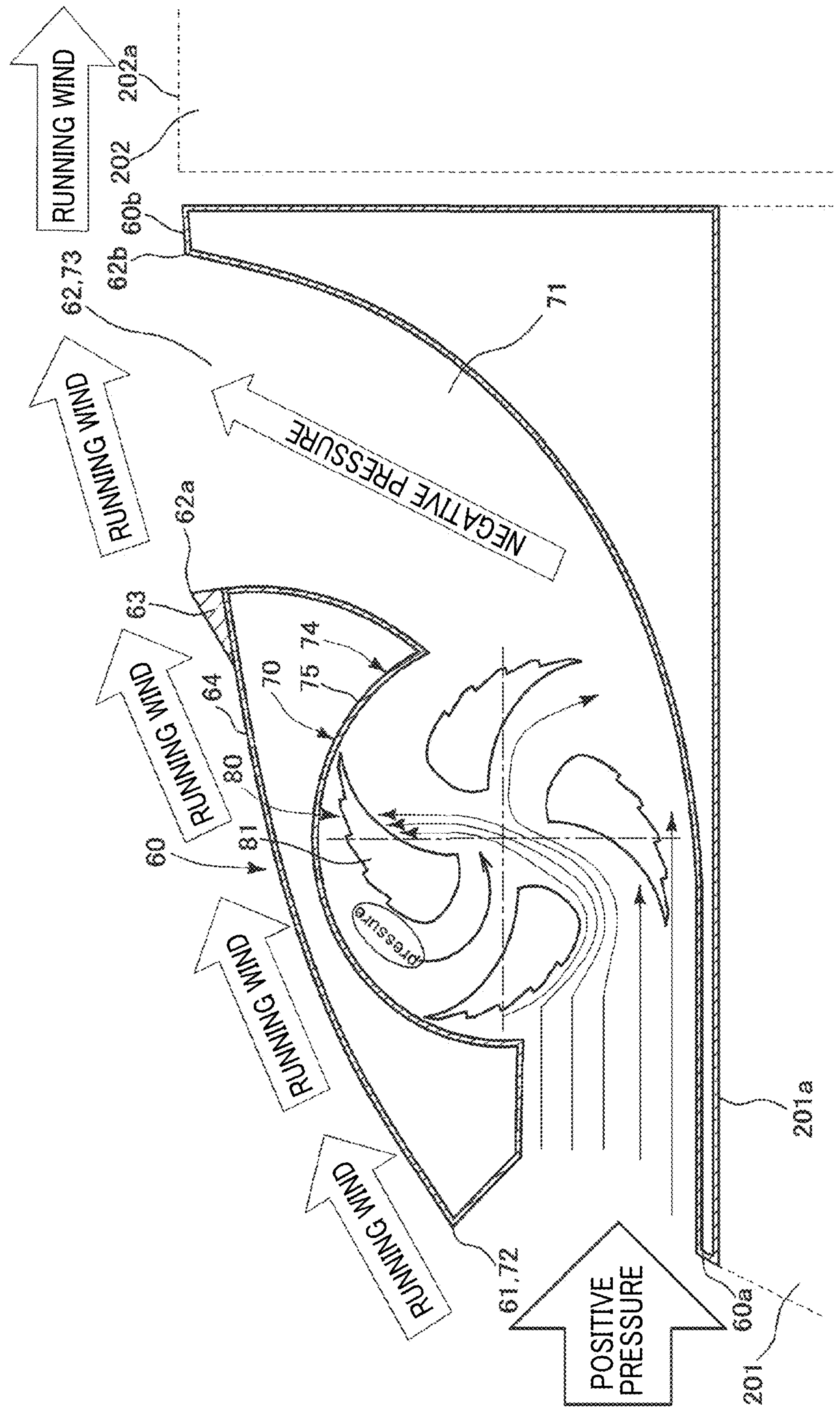
FIG. 19 is a cross-sectional view of an outer cover, an inner cover, and a rotor blade of the second embodiment as viewed from a left surface side of the vehicle.
Figure 20:
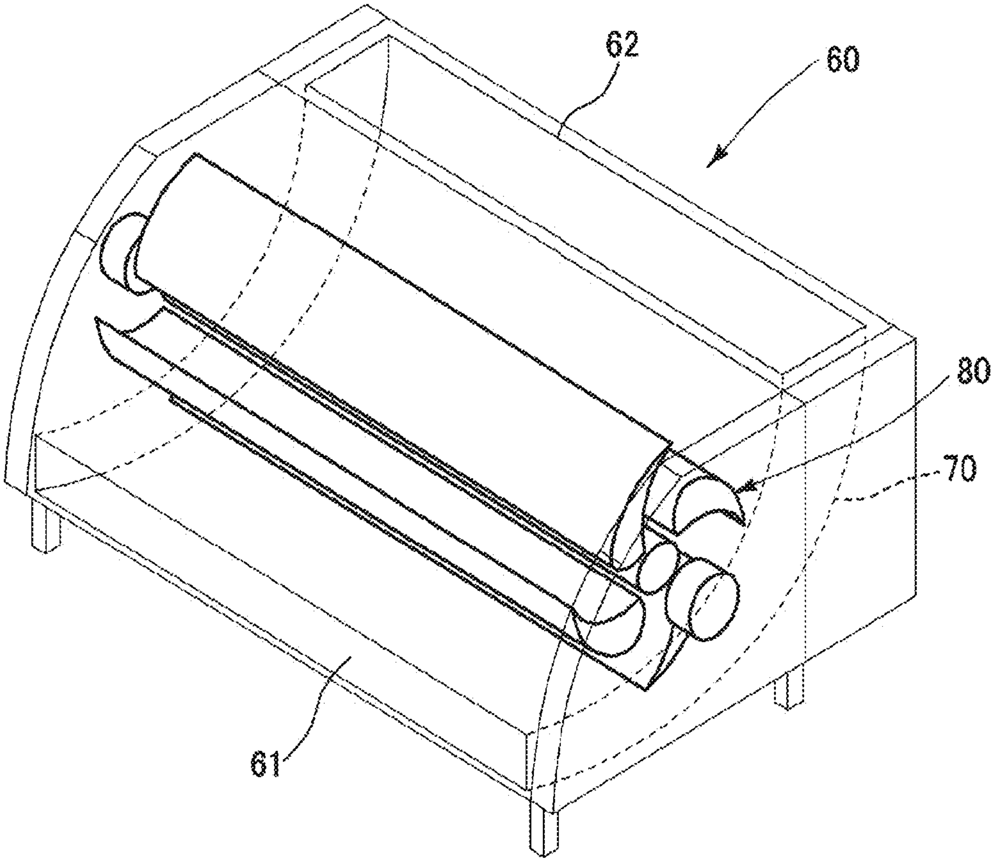
FIG. 20 is a perspective view of an outer cover and a wind power generation device disposed inside the outer cover of the second embodiment.

The vehicle 200 includes an outer cover 60 provided on the occupant compartment ceiling portion 201*a*, an inner cover 70 as a passage forming unit provided in the outer cover 60, and a wind power generation device 80 provided in the inner cover 70 (see FIGS. 18 to 20). Moreover, FIGS. 18 and 20 show the wind power generation device 80 viewed through the outer cover 60 from outside.

The outer cover 60 is provided to be exposed to an outer space of the vehicle 200. The outer cover 60 forms an accommodation space for accommodating the inner cover 70 and the wind power generation device 80 inside. The outer cover 60 is provided to blocks front, rear, left, right, upper, and lower sides of the accommodation space. An outer surface of the outer cover 60 constitutes a part of an outer surface of the vehicle 200.

Specifically, the outer cover 60 has a front surface portion 60*a* facing an outer space in front of the vehicle 200 and an upper surface portion 60*b* facing an outer space above the vehicle. The front surface portion 60*a* is formed in, for example, an inclined shape that is gradually displaced rearward toward the upper side. In addition, when a virtual plane perpendicular to a horizontal line extending in the front-rear direction of the vehicle 200 is defined as a virtual perpendicular plane, an inclination angle of the front surface portion 60*a* with respect to the virtual perpendicular plane may be set in the same manner as the inclination angle of the front surface 201*b* of the vehicle body 201 with respect to the virtual vertical plane. Specifically, an absolute value of a difference between the inclination angle of the front surface portion 60*a* and the inclination angle of the front surface 201*b* may be, for example, 10 degrees or smaller. In addition, the front surface portion 60*a* may be provided to be continuous with the front surface 201*b* of the vehicle body 201. In other words, a step having a horizontal surface is not formed at a boundary between the front surface portion 60*a* and the front surface 201*b*.

The outer cover 60 has a front opening 61 that faces an outer space in front of the vehicle 200, and an upper opening 62 that faces an outer space above the vehicle at a position behind and above the front opening 61. The front opening 61 is formed at the front surface portion 60*a*. The upper opening 62 is formed at the upper surface portion 60*b*. A front end 62*a* of the upper opening 62 is positioned above a rear end 62*b*. That is, the front end 62*a* is provided to form a step above the rear end 62*b*. This step is set to, for example, more than 0 cm and 20 cm or less. In addition, the front end 62*a* may be positioned above the upper surface 202*a* of the cargo accommodation compartment 202. The outer cover 60 includes a step forming portion 63 that forms the step at a position adjacent to the upper opening 62 in front of the upper opening 62 (see FIG. 19). The step forming portion 63 is formed in the same manner as the step forming portion 110 (see FIG. 12) of the first embodiment. The step forming portion 63 functions as an angle changing portion that changes a surface angle of a portion 64 of the outer cover 60 between the front opening 61 and the upper opening 62, in other words, functions as an angle changing portion that changes the angle of the portion 64 (upper surface portion 60*b*) with respect to a horizontal plane (in other words, a plane parallel to the ground contact surface of the vehicle 200) to a larger angle toward the upper side. In addition, the step forming portion 63 functions as a flow direction changing portion that changes a flow direction of wind flowing from the front side along the portion 64 (upper surface portion 60*b*) to an upward direction (strictly, obliquely upward direction). The step forming portion 63 may be configured as a separate portion from a plate member constituting the upper surface portion 60*b* or may be configured as a part of the plate member.

The portion 64 (see FIG. 19) of the outer cover 60 between the front opening 61 and the upper opening 62 is formed in a streamlined shape, specifically, formed in a curved surface shape that is gradually displaced upward toward the rear side. The center of curvature of the portion 64 is set at a position below the portion 64. That is, the portion 64 is formed in an upwardly convex curved surface shape.

The inner cover 70 is formed in the same manner as the inner cover 112 of the first embodiment and functions as a duct that forms a passage 71 that guides wind flowing in from the front opening 61 to the upper opening 62. An inlet 72 of the passage 71 is provided at a position facing the front opening 61. The inlet 72 may be provided to be slightly separated from the front opening 61 or may be connected to the front opening 61 and provided to coincide with the front opening 61.

An outlet 73 of the passage 72 is provided at a position facing the upper opening 62. The outlet 73 may be provided at a position separated from the upper opening 62 or may be connected to the upper opening 62 and provided to coincide with the upper opening 62. An area of the outlet 73 is larger than an area of the inlet 72.

An arcuate portion 75 is formed at an upper surface portion 74 of the inner cover 70. The arcuate portion 75 is formed in the same manner as the arcuate portion 114*c* (see FIG. 12) of the first embodiment. That is, the arcuate portion 75 is formed to hide a region above a rotation axis of the wind power generation device 80 (region having a headwind) when viewed from the front opening 61. Similarly to the first embodiment, a central angle of the arcuate portion 75 is set to, for example, 90 degrees or larger and 180 degrees or smaller.

The wind power generation device 80 is configured similarly to the wind power generation device 1 of the first embodiment. The wind power generation device 80 is provided in a space surrounded by the arcuate portion 75 in the passage 71 such that the rotation axis of the wind power generation device 80 is directed in the right-left direction of the vehicle 200 and the rotation axis coincides with a center of a virtual circle formed by the arcuate portion 75. In addition, rotor blades 81 of the wind power generation device 80 are provided to rotate counterclockwise as viewed from a left surface side of the vehicle 200 (as viewed from a direction of FIG. 19).

In addition, the vehicle 200 has the same configuration as that of FIG. 14, that is, includes a converter that converts AC power generated by the wind power generation device 80 into DC power, a battery that is charged with the DC power converted by the converter, an inverter that converts the DC power of the battery into AC power, a traveling drive motor that rotates wheels by the AC power converted by the inverter, and a connector for connecting to an external power supply.

Also in the embodiment, the same effects as those of the first embodiment can be obtained. That is, running wind having a positive pressure at the front opening 61 and running wind having a negative pressure at the upper opening 62 can enhance the air flow efficiency of the passage 71, and thus the rotation efficiency of the rotor blade 81 can be improved.

In addition, since the portion 64 (see FIG. 19) of the outer cover 60 between the front opening 61 and the upper opening 62 is formed in a curved surface shape that is gradually displaced upward toward the rear side, the pressure of the running wind flowing along this portion 64 can be made to be negative pressure. Further, since the front surface 201*b* of the vehicle body 201 is formed in an inclined shape and the front surface portion 60*a* of the outer cover 60 is formed in an inclined shape continuous with the front surface 201*b*, the running wind easily flows along the front surface 201*b*, the front surface portion 60*a*, and the upper surface portion 60*b*, and the air resistance due to the running wind can be reduced.

Third Embodiment

Figure 21:
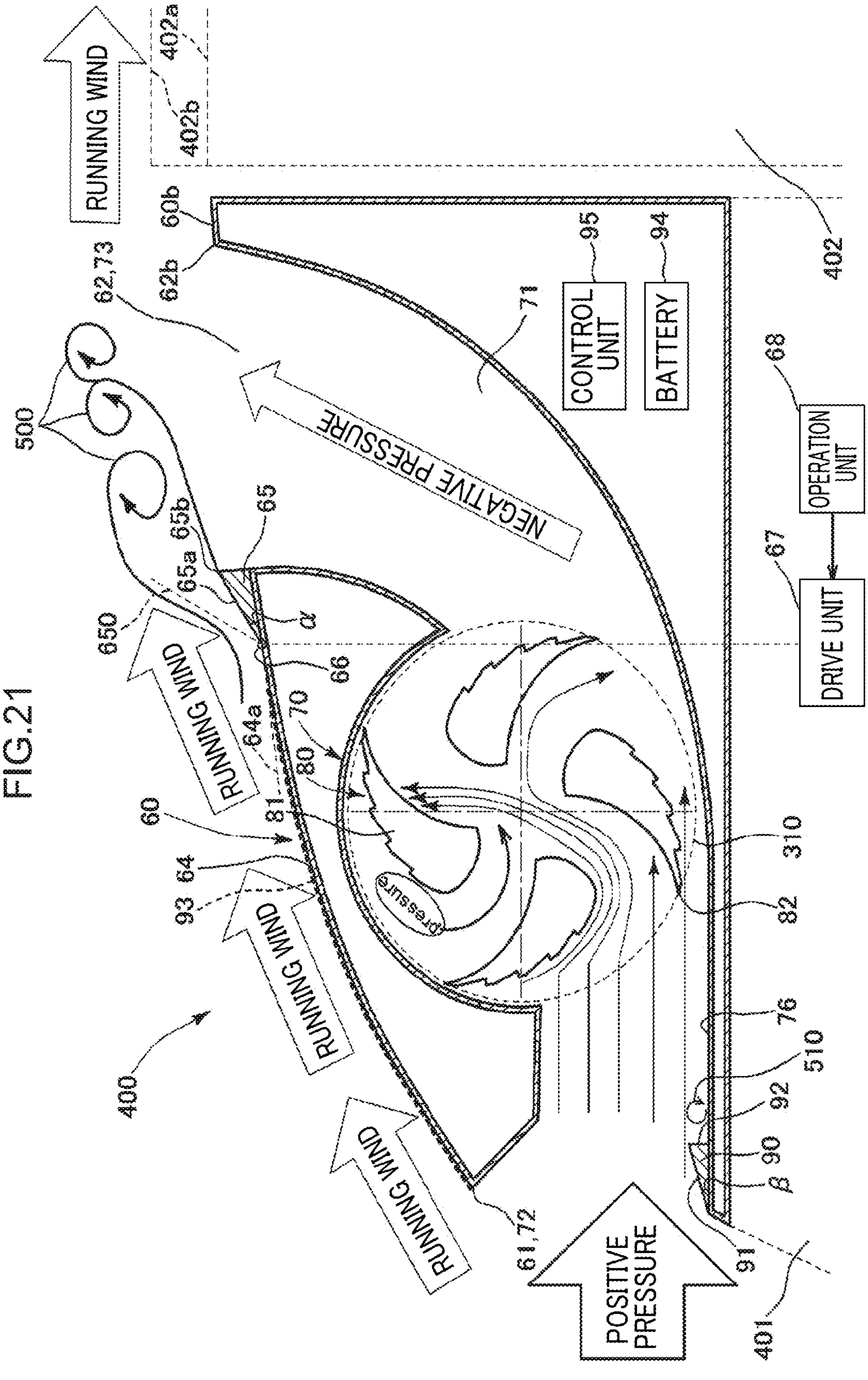
FIG. 21 is a cross-sectional view of a part (an outer cover, an inner cover, and a rotor blade) of a vehicle of a third embodiment as viewed from a left surface side of the vehicle.
Figure 22:
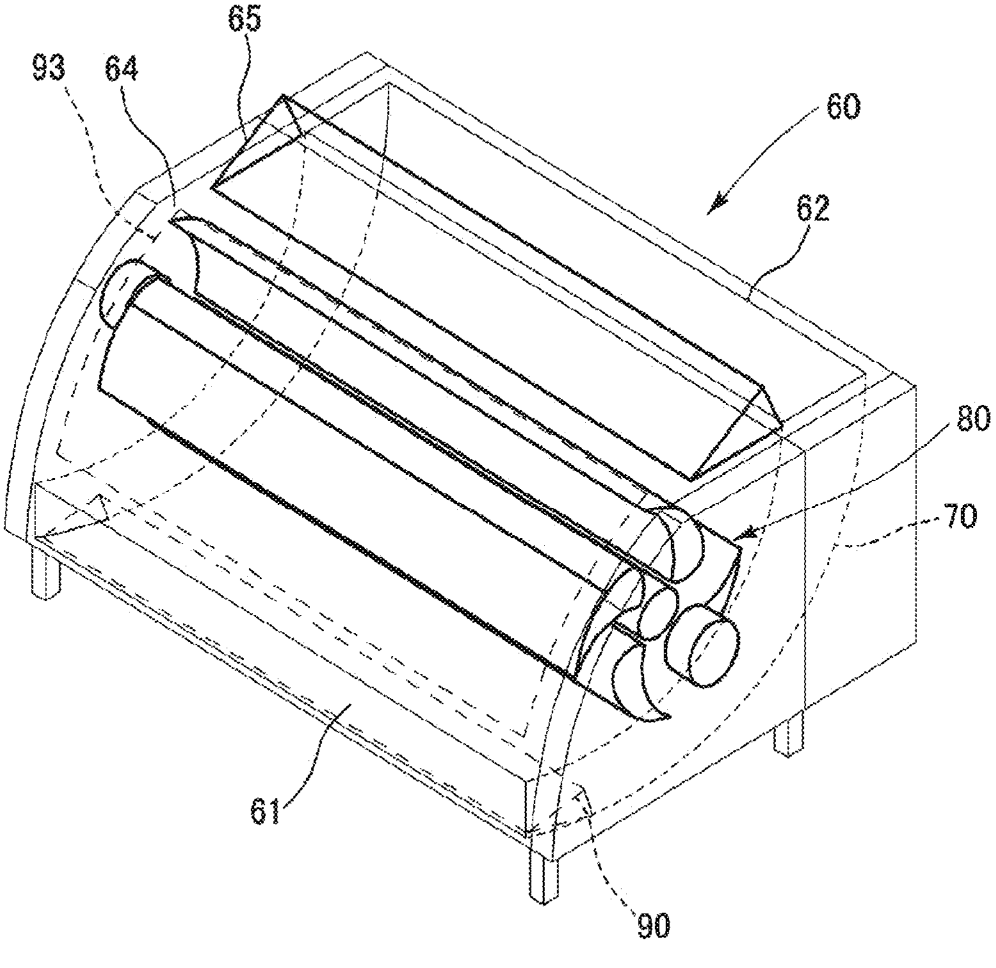
FIG. 22 is a perspective view of the outer cover and a wind power generation device disposed inside the outer cover of the third embodiment.

Next, a third embodiment of the disclosure will be described focusing on a section different from the above embodiments. FIG. 21 is a side view of a part of a vehicle according to the embodiment. FIG. 22 is a perspective view of an outer cover 60 of the embodiment and a wind power generation device 80 disposed inside the outer cover. Similarly to the second embodiment, a vehicle 400 of FIG. 21 is a cargo vehicle (so-called truck) including a vehicle body 401 forming a seat space (occupant compartment) for occupants including a driver, and a cargo accommodation compartment 402 connected to a posterior section of the vehicle body 401. In FIG. 21, an angle changing portion 65 (flow direction changing portion) differs from the angle changing portion 63 (step forming portion, flow direction changing portion) in FIG. 19 (second embodiment). In addition, the vehicle 400 of FIG. 21 differs from the vehicle 200 (See FIGS. 18 and 19) of the second embodiment in that the vehicle 400 includes a drive unit 67, an operation unit 68, an upward displacement portion 90, a solar panel 93, a battery 94, and a control unit 95 in addition to the angle changing portion 65. In addition, in the vehicle 400, for example, the cargo accommodation compartment 402 is configured to be separable from the vehicle body 401, and another cargo accommodation compartment 402 is configured to be connectable to the vehicle body 401. The vehicle 400 is the same as the vehicle 200 of the second embodiment except for the angle changing portion 65, the drive unit 67, the operation unit 68, the upward displacement portion 90, the solar panel 93, the battery 94, the control unit 95, and the cargo accommodation compartment 402. In FIG. 21, the same components as those of the vehicle 200 of the second embodiment are denoted by the same reference numerals. Description of parts of the vehicle 400 similar to those of the vehicle 200 of the second embodiment will be omitted as appropriate.

Similarly to the second embodiment, the outer cover 60 is provided on the vehicle body 401 to accommodate the wind power generation device 80 and the inner cover 70. The outer cover 60 has the angle changing portion 65 in front of the upper opening 62 (also see FIG. 22). For example, the angle changing portion 65 is provided to project from the upper surface portion **60*b* at a position adjacent to the upper opening 62 on the front side of the upper opening 62. The angle changing portion 65 functions as an angle changing portion that changes a surface angle of the portion 64 of the outer cover 60 between the front opening 61 and the upper opening 62, and in other words, is formed in a shape that changes an angle of the portion 64 (upper surface portion 60*b*) with respect to a horizontal plane (in other words, a plane parallel to the ground contact surface of the vehicle 400) to a larger angle toward the upper side. In other words, the angle changing portion 65 functions as a flow direction changing portion that changes the flow direction of the wind flowing from the front side along the portion 64 (upper surface portion 60*b*) to an upward direction (strictly, obliquely upward direction). Specifically, the angle changing portion 65 has an upper inclined surface 65*a* that is gradually displaced upward toward the rear side. An inclination angle of the upper inclined surface 65*a* with respect to the horizontal plane is larger than an inclination angle of a tangent plane 64*a* of the portion 64 (upper surface portion 60*b*) at a front end of the upper inclined surface 65*a* with respect to the horizontal plane. A rear end 65*b* of the upper inclined surface 65*a* functions as a front end of the upper opening 62**.

The angle changing portion 65 is configured to change an inclination angle α of the upper inclined surface **65*a* with respect to the upper surface portion 60*b*. Specifically, the angle changing portion 65 includes a rotation shaft 66 connected to a front end of the angle changing portion 65 (upper inclined surface 65*a*). The rotation shaft 66 is provided to have an axis which is directed in a direction parallel to a right-left direction of the vehicle 400. The rotation shaft 66 is provided to be rotatable around the axis. In this manner, the angle changing portion 65 is provided to be rotatable around the axis of the rotation shaft 66. In this case, the angle changing portion 65 cannot move unlimitedly about the axis of the rotation shaft 66, and a movement range of the angle changing portion 65 is limited to a predetermined range. Specifically, the movement range of the angle changing portion 65 is determined such that the inclination angle α of the upper inclined surface 65*a*** falls within a range of, for example, larger than 0 degrees and 45 degrees or smaller.

The vehicle 400 includes a drive unit 67 such as a motor that rotates the rotation shaft 66 around the axis thereof and an operation unit 68 that controls drive of the drive unit 67. The operation unit 68 is provided around a driver's seat of the vehicle 400, for example, and is configured as a section operated by an occupant. The operation unit 68 may be configured as a rotation operation unit, a pressing operation unit, a lever operation unit, or another type of operation unit.

The drive unit 67 is controlled to change the inclination angle α by operating the operation unit 68. For example, a change amount of the inclination angle α may be adjusted by adjusting an operation amount or the operation time of the operation unit 68. Specifically, the larger the operation amount or the operation time, the larger the change amount of the inclination angle α. In addition, for example, which direction the angle changing portion 65 moves in between directions in which the inclination angle α is increased and decreased may be determined according to an operation direction of the operation unit 68.

For example, the inclination angle α is preferably adjusted to an angle at which the rear end **65*b* (in other words, the front end of the upper opening 62) of the angle changing portion 65 is positioned above the rear end 62*b* of the upper opening 62. In addition, the inclination angle α is preferably adjusted such that, for example, the rear end 65*b* (in other words, the front end of the upper opening 62) of the angle changing portion 65 is positioned at the same height as the upper surface of the cargo accommodation compartment 402** or positioned above the upper surface.

On the upper surface portion **60*b* of the outer cover 60, for example, a fitting portion into which the angle changing portion 65 is fitted is formed at a position in front of the upper opening 62, the fitting portion having a recessed shape or a shape penetrating an inner space. The angle changing portion 65 may be provided such that a lower part of the angle changing portion 65** is fitted into the fitting part and an upper part thereof projects from the fitting part.

As shown in FIGS. 21 and 22, the upward displacement portion 90 is provided in the passage 71 of the inner cover 70. The upward displacement portion 90 is provided on a lower surface 76 of the passage 71 at a position between the inlet 72 of the passage 71 and the rotor blade 81. The upward displacement portion 90 is provided, for example, at a position closer to the inlet 72 than to the virtual circle 310 indicating the rotation locus of an outer end portion 82 of the rotor blade 81, and specifically, is provided, for example, at a position adjacent to the inlet 72. The lower surface 76 of the passage 71 lower than the upward displacement portion 90 is present between the upward displacement portion 90 and the virtual circle 310 (rotor blade 81).

The upward displacement portion 90 is formed in a shape projecting upward with respect to the lower surface 76 of the passage 71. Specifically, the upward displacement portion 90 is formed in a substantially triangular shape when viewed from the side surface of FIG. 21. More specifically, the upward displacement portion 90 includes an upper inclined surface 91 that is gradually displaced upward toward the rear side and a rear surface 92 that connects a rear end of the upper inclined surface 91 and the lower surface 76 of the passage 71. The upper inclined surface 91 is formed as a surface inclined with respect to the lower surface 76. An inclination angle β of the upper inclined surface 91 with respect to the lower surface 76 may be appropriately determined to improve the rotation efficiency of the rotor blade 81 and is set to, for example, larger than 0 degrees and 30 degrees or smaller. In addition, the inclination angle β may be set to, for example, an angle larger than 5 degrees, and more specifically, may be set to, for example, an angle larger than 10 degrees. In addition, the inclination angle β may be set to 20 degrees or smaller, and more specifically, may be set to 15 degrees or smaller. If the inclination angle β is too large (for example, larger than 30 degrees), the upward displacement portion 90 becomes the air resistance, and the rotation efficiency of the rotor blade 81 decreases.

The rear surface 91 of the upward displacement portion 90 faces the rear side of the passage 71 and is provided at a substantially right angle with respect to the lower surface 76. Moreover, the upward displacement portion 90 is provided over the entire range of a right-left width of the passage 71, for example, but may be provided only in a partial range of the right-left width. The upward displacement portion 90 functions as an upward push portion that pushes up the air flowing from the inlet 72, in other words, functions as a flow direction changing portion that changes the flow direction of the air entering in from the inlet 72 upward (strictly, obliquely upward direction).

In addition, as shown in FIGS. 21 and 22, the portion 64 of the outer cover 60 between the front opening 61 and the upper opening 62 includes the solar panel 93 that generates power by receiving sunlight. The solar panel 93 is fixed to a surface of the portion 64 to be exposed outward (upward) to be integrated with the portion 64. The solar panel 93 is provided along the surface of the portion 64. That is, the solar panel 93 is formed in a streamlined shape similarly to the portion 64, and specifically, is formed in a curved surface shape that is gradually displaced upward toward the rear side. Moreover, the solar panel 93 may have flexible to be deformed according to the curvature of the portion 64. Alternatively, the solar panel 93 may have a plurality of cells configured as rigid bodies, and the plurality of cells may be arranged in a curved shape along the portion 64.

As shown in FIG. 21, the vehicle 400 includes a battery 94 that stores electric power generated by the solar panel 93 and a control unit 95 that controls the electric power. The battery 94 may be a shared battery that also stores electric power such as generated power by the wind power generation device 80, other than the solar panel 93 or may be provided separately from a battery that stores power of a device other than the solar panel 93 (for example, power generated by the wind power generation device 80). For example, the control unit 95 performs control to charge the battery 94 with the generated power of the solar panel 93. In addition, the control unit 95 may also control the generated power of the wind power generation device 80 or may be provided separately from the control unit that controls the generated power of the wind power generation device 80. The electric power of the battery 94 may be used for driving a drive motor that drives the vehicle 400 in a case where the vehicle 400 is an electric car or a hybrid car, or the electric power may be used for other applications (for example, driving of a cooling device). The battery 94 and the control unit 95 may be provided anywhere in the vehicle 400, for example, may be provided in a space between the ceiling portion of the occupant compartment formed in the vehicle body 401 and the lower surface of the passage 71 of the inner cover 70, or may be provided at another place. In addition, the battery 94 and the control unit 95 may be provided at the same place in the vehicle 400, or may be provided at different places.

According to the embodiment, in addition to the effects of the second embodiment, the following effects can be obtained. That is, since the inclination angle α of the angle changing portion 65 can be changed, the rear end 65*b* of the angle changing portion 65 can be set at the same height as the upper surface of the cargo accommodation compartment 402 or at a position higher than the upper surface. For example, in a case where the cargo accommodation compartment 402 having an upper surface 402*a* is replaced with another cargo accommodation compartment 402 having an upper surface 402*b* higher than the upper surface 402*a*, the upper inclined surface 65*a* of the angle changing portion 65 can be changed to a position indicated by a dotted line 650 in FIG. 21 by increasing the inclination angle α. As a result, the rear end 65*b* of the angle changing portion 65 can be positioned at the same height as the upper surface 402*b* or to be higher than the upper surface 402*b*. As a result, it is possible to suppress the air flow flowing along the outer cover 60 from hitting the front surface of the cargo accommodation compartment 402, and it is possible to suppress generation of a turbulent flow for increasing the air pressure in the vicinity of the upper opening 62. In addition, when the air flow from the front side hits the angle changing portion 65, a vortex 500 with strong air is generated in the vicinity of the upper opening 62, and the air pressure of the upper opening 62 can be lowered by the vortex 500. By setting the air pressure of the upper opening 62 to a negative pressure, the flow velocity of the air in the passage 71 can be increased, and the rotation efficiency of the rotor blade 81 can be improved.

In addition, since an upper limit of the inclination angle α of the angle changing portion 65 is 45 degrees, it is possible to prevent the angle changing portion 65 from causing air resistance.

The present disclosers prepared a model similar to the structure including the outer cover 60, the inner cover 70, the rotor blade 81, and the angle changing portion 65 in FIG. 21 and tested how much the flow velocity in the passage 71 changes due to a difference between presence and absence of the angle changing portion 65. As a result, it was checked that the flow velocity in the passage 71 increased 1.3 times to 1.5 times in the case where the angle changing portion 65 was provided as compared with the case where the angle changing portion was not provided.

In addition, the upper inclined surface 91 of the upward displacement portion 90 can push up the air entering the passage 71 from the lower end side of the inlet 72 to the upper side where the rotor blade 81 is positioned. As a result, air can efficiently hit against the rotor blades 81, and the rotation efficiency of the rotor blades 81 can be improved. In addition, a vortex 501 is generated behind the upward displacement portion 90 (see FIG. 21), and the vortex 501 can suppress air resistance due to friction with the lower surface 76 of the passage 71. As a result, the flow velocity in the passage 71 can be increased, and the rotation efficiency of the rotor blade 81 can be improved.

Further, the upper inclined surface 91 of the upward displacement portion 90 can be formed in an inclined shape that is gradually displaced upward toward the rear side, and the inclination angle β of the upper inclined surface 91 is 30 degrees or smaller, so that it is possible to suppress the upward displacement portion 90 from causing air resistance.

The present disclosers made a model similar to the structure including the outer cover 60, the inner cover 70, the rotor blade 81, and the upward displacement portion 90 in FIG. 21 and conducted an experiment of how much the flow velocity in the passage 71 changes due to a difference between presence and absence of the upward displacement portion 90. As a result, it was checked that when the upward displacement portion 90 was provided, the flow velocity in the passage 71 increased 1.2 times to 1.3 times as compared with the case where the upward displacement portion was not provided.

In addition, since the vehicle 400 includes the solar panel 93 in addition to the wind power generation device 80, it is possible to increase a travelable distance of the vehicle 400 by using the generated power of the solar panel 93 for driving the drive motor of the vehicle 400 in the case where the vehicle 400 is an electric car. In addition, when the vehicle 400 travels by an engine, by using the generated power of the solar panel 93 for driving electrical components, a dead battery can be suppressed, and consumption of a fuel (light oil or the like) used for driving the engine can be suppressed. In addition, since the solar panel 93 is provided at a position exposed upward, the solar panel can efficiently receive sunlight. In addition, since the solar panel 93 is provided in a curved shape, it is possible to suppress the solar panel 93 from causing air resistance. In addition, since the battery 94 and/or the control unit 95 are provided in a space between, for example, the ceiling portion of the occupant compartment and the lower surface of the passage 71 of the inner cover 70, an installation place of the battery 94 and/or the control unit 95 can be easily secured.

MODIFICATION EXAMPLES

Moreover, the disclosure is not limited to the above embodiments, and various modifications can be made. For example, in the above embodiments, the number of rotor blades provided in each rotation unit (first rotation unit or second rotation unit) of the rotation device is four, but may be three or five or more.

In addition, in the above embodiments, the axial gap type power generation unit in which the field magnets and the power generation coils of the power generation unit are arranged to face each other in the rotation axis direction with the gap interposed therebetween has been exemplified. However, a radial gap type power generation unit in which the field magnets and the power generation coils are arranged to face each other in a radial direction perpendicular to the rotation axis with a gap interposed therebetween may be used.

In addition, in the above embodiments, an example in which the rotation device is divided into two rotation units (first rotation unit, second rotation unit) has been described, but the rotation device may be divided into three or more rotation units. Even in this case, an arrangement angle of the rotor blades in the circumferential direction is shifted while making the rotation direction the same between the plurality of rotation units. For example, when an arrangement interval angle of the rotor blades in the circumferential direction in each rotation unit is denoted by Y, and the number of rotation units is denoted by N, the arrangement position of the rotor blades in the rotation direction is shifted by an angle of Y/N between the plurality of rotation units. For example, when the rotation device is divided into three units of the first rotation unit, the second rotation unit, and the third rotation unit, the number of the rotor blades of each rotation unit is four, and the arrangement interval angle Y is 90 degrees, the arrangement position of the rotor blades in the rotation direction is shifted by 90/3=30 degrees between the first rotation unit and the second rotation unit, and the arrangement position of the rotor blades in the rotation direction is shifted by 30 degrees between the second rotation unit and the third rotation unit. This also makes it possible to suppress the drag variation with respect to the rotation angle.

In addition, in the above embodiments, the example in which the arrangement positions of the rotor blades are shifted by the angle (=Y/2) that is half the arrangement interval angle Y between the first rotation unit and the second rotation unit of the rotation device has been described. However, the first rotation unit and the second rotation unit may be provided with an angle difference other than Y/2. Even in this case, the drag variation with respect to the rotation angle can be suppressed.

In addition, in the above embodiments, the example in which the generated power of the wind power generation device is used for driving the traveling drive motor of the vehicle has been described, but the generated power may be used for applications other than driving the vehicle (for example, an auxiliary power supply of a cooling device provided in the vehicle).

In addition, the first embodiment may have a configuration in which the upper surface portion 104 of the outer cover 102 and the upper surface portion 114 of the inner cover 112 are integrated, and as the upper surface portion 104 of the outer cover 102 is opened, the upper surface portion 114 of the inner cover 112 is separated from the lower surface portion 115 to expose the passage 113 and the wind power generation device 1 inside. Accordingly, this facilitates maintenance and replacement of the inner cover 112 and the wind power generation device 1.

In addition, in the third embodiment, the example in which the inclination angle $\alpha$ of the angle changing portion 65 is changed by electric power has been described. However, the angle changing portion 65 may be configured to manually change the inclination angle $\alpha$. In this case, an operation unit that mechanically (without using electricity) rotates the rotation shaft 66 of the angle changing portion 65 may be provided.

In addition, although the example in which the upward displacement portion 90 (see FIG. 21) described in the third embodiment is provided in the cargo vehicle 400 (truck) is described, the upward displacement portion may be provided in the electric car 100 (FIG. 10, FIG. 11) described in the first embodiment. In this case, an upward displacement portion having the same shape as the upward displacement portion 90 may be provided the lower surface of the passage 113 of the inner cover 112 shown in FIG. 12 in the vicinity of the inlet 113*a*. As a result, the rotation efficiency of the rotor blade 9 can be further improved. Moreover, when the upward displacement portion is provided in the electric car 100, the opening/closing unit 117 shown in FIG. 12 may not be provided in order to avoid interference with the upward displacement portion. Alternatively, the installation position of the opening/closing unit 117 or the installation position of the upward displacement portion may be shifted rearward (side close to the rotor blade 9) so that the upward displacement portion and the opening/closing unit 117 do not interfere with each other.

In addition, in each of the above embodiments, an example in which the plurality of recesses (in the first embodiment, the recesses 20) are formed in the front blade surface of the rotor blade has been described, but the recesses may not be formed. In addition, in each of the above embodiments, an example in which the recesses (the recesses 32 in the first embodiment) penetrating a portion between the first curved surface and the rear blade surface are formed at the outer end portion of the rotor blade has been described, but the recesses may not be formed. In addition, in each of the above embodiments, an example in which the rotation device is divided into two rotation units (first rotation unit, second rotation unit) has been described.

However, a rotation device including only one rotation unit may be provided. In addition, in the third embodiment, the example in which the solar panel is provided in the cargo vehicle has been described, but a solar panel having a shape along the upper surface portion 104 may be provided in a portion of the upper surface portion 104 of the outer cover 102 of the vehicle 100 of the first embodiment, the portion being positioned between the front opening 107 and the upper opening 108.

REFERENCE SIGNS LIST

1, 80 Wind power generation device
2 Rotation device
3 Power generation unit
4 First rotation unit
5 Second rotation unit
9, 81 Rotor blade
10 Front blade surface
11 Rear blade surface
12 First curved surface
13 Second curved surface
15 Outer end portion of rotor blade
32 Recess
100, 200, 400 Vehicle
102, 60 Outer cover
107, 61 Front opening
108, 62 Upper opening
112, 70 Inner cover (passage forming unit)
110, 63, 65 Step forming portion (angle changing portion, flow direction changing portion)
90 Upward displacement portion
93 Solar panel

The invention claimed is:

1. A vehicle comprising:
an outer cover that is exposed to an outer space of the vehicle and that forms a front opening facing an outer space in front, and an upper opening positioned behind and above the front opening and facing an outer space above;
a passage forming unit that forms a passage for guiding wind that enters from the front opening to the upper opening inside the outer cover; and
a rotor blade for wind power generation that is provided in the passage to be rotatable about a rotation axis directed in a right-left direction of the vehicle,
wherein the rotor blade includes:
a front blade surface that is parallel to the rotation axis and that is curved so as to project forward in a rotation direction; and
a rear blade surface that is disposed on a back surface side of the front blade surface, that is parallel to the rotation axis and that is curved so as to be recessed toward the front side in the rotation direction, the rear blade surface having a smaller curvature depth than the front blade surface,
wherein, in a plan view orthogonal to the rotation axis, an end portion of the front blade surface on a side far from the rotation axis is defined as an outer end portion, and an end portion of the front blade surface on a side close to the rotation axis is defined as an inner end portion, and
wherein the front blade surface includes:
a first curved surface that constitutes a section away from the rotation axis and that extends from the outer end portion toward the front side in the rotation direction; and
a second curved surface that constitutes a section close to the rotation axis, that is connected to the inner end portion from an opposite side, of the first curved surface, from the outer end portion toward a rear side in the rotation direction, and that has a shorter surface length than the first curved surface in the plan view,
wherein the rotor blade is configured to rotate counter-clockwise when viewed from a left surface side of the vehicle,
wherein the passage forming unit includes an arcuate portion formed in an arcuate shape along a circumference around the rotation axis at an upper side of the rotation axis and at an outer side of the rotor blade when viewed in a cross-section perpendicular to the rotation axis,
wherein the outer cover includes a flow direction changing portion that changes a flow direction of wind, flowing along the outer cover from a front side, to an upward direction, in front of the upper opening,
wherein the flow direction changing portion is formed in a shape gradually displaced upward toward a rear side, and
wherein the flow direction changing portion is configured to change an inclination angle with respect to the outer cover.

2. The vehicle according to claim 1, wherein a central angle of the arcuate portion is 90 degrees or larger and 180 degrees or smaller.

3. The vehicle according to claim 1, wherein an outlet of the passage forming unit is larger than an inlet of the passage forming unit.

4. The vehicle according to claim 1, further comprising a flow control unit that switches between a state in which flow of wind from the front opening to the rotor blade is permitted and a state in which flow of wind from the front opening to the rotor blade is blocked.

5. The vehicle according to claim 1, wherein the outer cover includes a front surface portion that forms a front end surface of the vehicle and forms the front opening, and an upper surface portion that extends rearward from the front surface portion and forms the upper opening, at a position in front of and below a windshield of the vehicle.

6. The vehicle according to claim 1,
wherein the vehicle is a cargo vehicle including a vehicle body forming an occupant compartment and a cargo accommodation compartment connected to a posterior section of the vehicle body, and
wherein the outer cover is provided on a ceiling portion of the occupant compartment.

7. The vehicle according to claim 1, wherein the vehicle is an electric car that does not include an internal combustion engine and runs by an electric motor.

8. The vehicle according to claim 1, wherein the outer cover has a solar panel at a section between the front opening and the upper opening.

9. A vehicle comprising:
an outer cover that is exposed to an outer space of the vehicle and that forms a front opening facing an outer space in front, and an upper opening positioned behind and above the front opening and facing an outer space above;
a passage forming unit that forms a passage for guiding wind that enters from the front opening to the upper opening inside the outer cover; and a rotor blade for wind power generation that is provided in the passage to be rotatable about a rotation axis directed in a right-left direction of the vehicle, wherein the rotor blade includes:

a front blade surface that is parallel to the rotation axis and that is curved so as to project forward in a rotation direction; and a rear blade surface that is disposed on a back surface side of the front blade surface, that is parallel to the rotation axis and that is curved so as to be recessed toward the front side in the rotation direction, the rear blade surface having a smaller curvature depth than the front blade surface, wherein, in a plan view orthogonal to the rotation axis, an end portion of the front blade surface on a side far from the rotation axis is defined as an outer end portion, and an end portion of the front blade surface on a side close to the rotation axis is defined as an inner end portion, and wherein the front blade surface includes:

a first curved surface that constitutes a section away from the rotation axis and that extends from the outer end portion toward the front side in the rotation direction; and a second curved surface that constitutes a section close to the rotation axis, that is connected to the inner end portion from an opposite side, of the first curved surface, from the outer end portion toward a rear side in the rotation direction, and that has a shorter surface length than the first curved surface in the plan view, wherein the rotor blade is configured to rotate counter-clockwise when viewed from a left surface side of the vehicle, wherein the passage forming unit includes an arcuate portion formed in an arcuate shape along a circumference around the rotation axis at an upper side of the rotation axis and at an outer side of the rotor blade when viewed in a cross-section perpendicular to the rotation axis, and wherein a front end of the upper opening is positioned above a rear end of the upper opening.

10. A vehicle comprising:

an outer cover that is exposed to an outer space of the vehicle and that forms a front opening facing an outer space in front, and an upper opening positioned behind and above the front opening and facing an outer space above;

a passage forming unit that forms a passage for guiding wind that enters from the front opening to the upper opening inside the outer cover; and a rotor blade for wind power generation that is provided in the passage to be rotatable about a rotation axis directed in a right-left direction of the vehicle, wherein the rotor blade includes:

a front blade surface that is parallel to the rotation axis and that is curved so as to project forward in a rotation direction; and a rear blade surface that is disposed on a back surface side of the front blade surface, that is parallel to the rotation axis and that is curved so as to be recessed toward the front side in the rotation direction, the rear blade surface having a smaller curvature depth than the front blade surface, wherein, in a plan view orthogonal to the rotation axis, an end portion of the front blade surface on a side far from the rotation axis is defined as an outer end portion, and an end portion of the front blade surface on a side close to the rotation axis is defined as an inner end portion, and wherein the front blade surface includes:

a first curved surface that constitutes a section away from the rotation axis and that extends from the outer end portion toward the front side in the rotation direction; and a second curved surface that constitutes a section close to the rotation axis, that is connected to the inner end portion from an opposite side, of the first curved surface, from the outer end portion toward a rear side in the rotation direction, and that has a shorter surface length than the first curved surface in the plan view, wherein the passage forming unit includes:

an upward displacement portion of a lower surface of the passage, the upward displacement portion being positioned between an inlet of the passage forming unit and the rotor blade, and having a shape gradually displaced upward toward a rear side; and a lower surface which is lower than the upward displacement portion at a position between the upward displacement portion and the rotor blade.

11. A vehicle comprising:

an outer cover that is exposed to an outer space of the vehicle and that forms a front opening facing an outer space in front, and an upper opening positioned behind and above the front opening and facing an outer space above;

a passage forming unit that forms a passage for guiding wind that enters from the front opening to the upper opening inside the outer cover; and a rotor blade for wind power generation that is provided in the passage to be rotatable about a rotation axis directed in a right-left direction of the vehicle, wherein the rotor blade includes:

a front blade surface that is parallel to the rotation axis and that is curved so as to project forward in a rotation direction; and a rear blade surface that is disposed on a back surface side of the front blade surface, that is parallel to the rotation axis and that is curved so as to be recessed toward the front side in the rotation direction, the rear blade surface having a smaller curvature depth than the front blade surface, wherein, in a plan view orthogonal to the rotation axis, an end portion of the front blade surface on a side far from the rotation axis is defined as an outer end portion, and an end portion of the front blade surface on a side close to the rotation axis is defined as an inner end portion, and wherein the front blade surface includes:

a first curved surface that constitutes a section away from the rotation axis and that extends from the outer end portion toward the front side in the rotation direction; and a second curved surface that constitutes a section close to the rotation axis, that is connected to the inner end portion from an opposite side, of the first curved surface, from the outer end portion toward a rear side in the rotation direction, and that has a shorter surface length than the first curved surface in the plan view, wherein the outer end portion has a plurality of recesses that penetrate a portion between the first curved surface and the rear blade surface and are formed in a direction in which the outer end portion extends.

* * * * *